United States Patent [19]

Turnbull

[11] Patent Number: 5,208,765
[45] Date of Patent: May 4, 1993

[54] COMPUTER-BASED METHOD AND SYSTEM FOR PRODUCT DEVELOPMENT

[75] Inventor: Robert S. Turnbull, Sunnyvale, Calif.

[73] Assignee: Advanced Micro Devices, Inc., Sunnyvale, Calif.

[21] Appl. No.: 556,790

[22] Filed: Jul. 20, 1990

[51] Int. Cl.⁵ .............................. G06F 15/20
[52] U.S. Cl. ..................... 364/552; 364/401
[58] Field of Search ...................... 364/401, 552

[56] References Cited

U.S. PATENT DOCUMENTS

| | | | |
|---|---|---|---|
| 4,644,480 | 2/1987 | Haruna et al. | 364/552 |
| 4,648,023 | 3/1987 | Powell | 364/401 X |
| 4,679,137 | 7/1987 | Lane et al. | 364/188 |
| 4,878,175 | 10/1989 | Norden-Paul et al. | 364/401 X |
| 4,896,269 | 1/1990 | Tong | 364/401 X |
| 4,937,743 | 6/1990 | Rassman et al. | 364/401 |

FOREIGN PATENT DOCUMENTS 247743  4/1987  European Pat. Off. .

OTHER PUBLICATIONS

Brimm, "Computers in Critical Care", Critical Care Nursing Quarterly, Mar. 1987, pp. 53-63.
Mowry et al., "Automated Information Systems in Quality Assurance", no date, Reproduced from Nursing Economics.

*Primary Examiner*—Thomas G. Black
*Assistant Examiner*—Edward R. Cosimano
*Attorney, Agent, or Firm*—Skjerven, Morrill, MacPherson, Franklin & Friel

[57] ABSTRACT

A method and structure for monitoring product development is provided. In accordance with the method of this invention the product development is divided into a plurality of stages. Each stage in turn includes a set of requirements which must be completed in order for the stage to be completed. Each requirement is provided with a unique identifier for ease of reference to the requirement. Each requirement also has associated with it an indicium for indiciating the status of that requirement (i.e. whether the requirement is complete or not). Each stage and its requirements are capable of being visually displayed, typically on a display unit connected to a computer system. Thus a user is capable of easily determining the instantaneous status of the development of the product by reviewing each of the requirements of each of the stages of the product development and determining from the display the status of each requirement.

39 Claims, 33 Drawing Sheets

FIGURE 1

TO DISPLAY REQUIREMENT, POSITION CURSOR, PUSH KEY F10
TO DISPLAY REQUIREMENT DATA, POSITION CURSOR, PUSH KEY F9

FIGURE 7a

PRODUCT CONTROL MATRIX 1

| STAGE 1 — DESIGN | STAGE 2 — ENGINEERING SAMPLES |
|---|---|
| 1  Process Qual I | 11  Process Qual II |
|  | 12  Mask Index Issued |
|  | 13  Mask Set Fab Acc'd |
| 2  Design Review | 14  Design Verification |
|  | 15  Design Re-Simulation |
| 3  Characterization I | 16  Characterization II |
| 4  Test Plan | 17  Test Flow Doc. |
| 5  Die Package Submission | 18  Assy. Process Doc. |
|  | 19  Package Outline |
| 6  Packing Design |  |
|  | 20  Manufacturing Logistics Plan |
|  | 21  Records Plan |
| 7  Product Control Team |  |
| 8  Statistical Process Mgt. I | 22  Statistical Process Mgt II |
| 9  Product Performance Plan I | 23  Product Performance |
| 10  Package Qual I | 24  Package Qual II |
|  | 25  Product Qual I |
|  | 26  Rel Monitor I |
|  | 27  R. F. B. Approved |
|  | 28  Advance Data Sheet |
| Prod. Mgr/Quality App'd | App'd |
| Nomen/Ship        "DS" | "ES" |
| Mark                   1st | "ES" |
| Revenue           Mask | No (Except Acknowledged) |
| Warranty           Set | No |

FIGURE 7b

PRODUCT CONTROL MATRIX 1 (Cont.)

| 401-3 | STAGE 3<br><br>DEVELOPMENT<br>PRODUCT | | STAGE 4  401-4<br>STANDARD<br>COMMERCIAL<br>PRODUCT | |
|---|---|---|---|---|
| 29 | Process Qual III | | | |
| | | | 44 | Test Programs Class 11 |
| 30 | Characterization III | | 45 | Characterization IV |
| 31 | Test Programs Released | | 46 | Test Programs Rev. Cntrl |
| 32 | Quality Assur. Tests Started | | | |
| 33 | Build Sheet Released | | | |
| 34 | Packing Defined | | | |
| 35 | Visual/Mechanical Requs. Defined | | | |
| 36 | Marking Requs. Defined | | | |
| | | | 47 | ECN Established |
| | | | 48 | Passport/Spec Audit |
| 37 | Statistical Process Mgt. III | | 49 | Statistical Process Mgt IV |
| 38 | Product Performance III | | 50 | Product Performance IV |
| 39 | Package Qual III | | | |
| 40 | Product Qual II | | 51 | Product Qual III |
| 41 | Rel Monitor II | | 52 | Rel Monitor III |
| 42 | Proc. Spec ("DV") | | 53 | Proc. Spec ("STD") |
| 43 | Preliminary Data Sheet | | 54 | Final Data Sheet |
| | //406-3// App'd // | | //406-4// App'd // | |
| | "DV" | | "PR" | |
| | "DV" | | STD | |
| | YES | | YES | |
| | YES | | YES | |

FIGURE 7c

PRODUCT CONTROL MATRIX 1 (Cont.)

| 401-5 STAGE 5<br>MILITARY PRODUCT | | STAGE 6 401-6<br>ALERT CONTROL | |
|---|---|---|---|
| | | 67 RMP Failure | |
| | | 68 Field Failure | |
| | | 69 Out of Control SPC | |
| | | 70 Baseline (Passport) Changes | |
| 55 Test Programs Class 11 (Mil) | | | |
| 56 Characterization V | | | |
| 57 Test Progs. Rev. Cntrl. (Mil) | | | |
| | | | |
| | | | |
| | | | |
| | | | |
| | | | |
| | | | |
| 58 APL/CPL App'd | | | |
| | | | |
| 59 E. C. N. (Mil) | | | |
| 60 Passport (Mil) | | | |
| 61 Statistical Process Mgt. V | | | |
| 62 Product Performance V (Mil) | | | |
| | | | |
| 63 Product Qual IV | | | |
| 64 Rel Monitor IV | | | |
| 65 Proc. Spec. (Mil Mark/Temp) | | | |
| 66 Military Data Sheet | | | |
| ///////App'd/////406-5/ | | ///////App'd/////406-6/ | |
| "PR" + APL/CPL | | | |
| STD. MIL. | | | |
| YES | | | |
| YES | | | |

FIGURE 8a

PRODUCT CONTROL MATRIX 2

| 401-1 STAGE 1 DESIGN | | STAGE 2 401-2 ENGINEERING SAMPLES | |
|---|---|---|---|
| 1 | | 11 | |
| | | 12 Mask Index Issued | |
| | | 13 Mask Set Fab Acc'd | |
| 2 Design Review | | 14 Design Verification | |
| | | 15 Design Re-Simulation | |
| 3 Characterization I | | 16 Characterization II | |
| 4 Test Plan | | 17 Test Flow Doc. | |
| 5 Die Package Submission | | 18 Assy. Process Doc. | |
| | | 19 Package Outline | |
| 6 Packing Design (Review) | | | |
| | | 20 Manufacturing Logistics Plan | |
| | | 21 Records Plan | |
| 7 Product Control Team | | | |
| 8 Statistical Process Mgt. I | | 22 Statistical Process Mgt II | |
| 9 Product Performance Plan I | | 23 Product Performance | |
| 10 Package Qual I | | 24 Package Qual II (Review) | |
| | | 25 Product Qual I | |
| | | 26 Rel Monitor I | |
| | | 27 R. F. B. Approved | |
| | | 28 Advance Data Sheet | |
| //406-1 Prod. Mgr/Quality App'd// | | ///////App'd/////// 406-2 | |
| Nomen/Ship | "DS" | | "ES" |
| Mark | 1st | | "ES" |
| Revenue | Mask | | No (Except Acknowledged) |
| Warranty | Set | | No |

FIGURE 8b

PRODUCT CONTROL MATRIX 2 (Cont.)

| 401-3 | STAGE 3 DEVELOPMENT PRODUCT | | STAGE 4 STANDARD COMMERCIAL PRODUCT | 401-4 |
|---|---|---|---|---|
| 29 | | | | |
| | | | 44 Test Programs Class 11 | |
| 30 | Characterization III | | 45 Characterization IV | |
| 31 | Test Programs Released | | 46 Test Programs Rev. Cntrl | |
| 32 | Quality Assur. Tests Started | | | |
| 33 | Build Sheet Released | | | |
| 34 | Packing Defined | | | |
| 35 | Visual/Mechanical Requs. Defined | | | |
| 36 | Marking Requs. Defined (Review) | | | |
| | | | 47 ECN Established | |
| | | | 48 Passport/Spec Audit | |
| 37 | Statistical Process Mgt. III | | 49 Statistical Process Mgt IV | |
| 38 | Product Performance III | | 50 Product Performance IV | |
| 39 | Package Qual III (Review) | | | |
| 40 | Product Qual II | | 51 Product Qual III | |
| 41 | Rel Monitor II | | 52 Rel Monitor III | |
| 42 | Proc. Spec ("DV") | | 53 Proc. Spec ("STD") | |
| 43 | Preliminary Data Sheet | | 54 Final Data Sheet | |
| //406-3// App'd // | | | //406-4// App'd // | |
| | "DV" | | "PR" | |
| | "DV" | | STD | |
| | YES | | YES | |
| | YES | | YES | |

FIGURE 8c

PRODUCT CONTROL MATRIX 2 (Cont.)

| 401-5 STAGE 5 MILITARY PRODUCT | | 401-6 STAGE 6 ALERT CONTROL | |
|---|---|---|---|
| | | 67 RMP Failure | |
| | | 68 Field Failure | |
| | | 69 Out of Control SPC | |
| | | 70 Baseline (Passport) Changes | |
| 55 Test Programs Class 11 (Mil) | | | |
| 56 Characterization V | | | |
| 57 Test Progs. Rev. Cntrl. (Mil) | | | |
| 58 APL/CPL App'd | | | |
| 59 E. C. N. (Mil) | | | |
| 60 Passport (Mil) | | | |
| 61 Statistical Process Mgt. V | | | |
| 62 Product Performance V (Mil) | | | |
| 63 Product Qual IV | | | |
| 64 Rel Monitor IV | | | |
| 65 Proc. Sec. (Mil Mark/Temp) | | | |
| 66 Military Data Sheet | | | |
| ////////App'd///////406-5/ | | ////////App'd///////406-6/ | |
| "PR" + APL/CPL | | | |
| STD. MIL. | | | |
| YES | | | |
| YES | | | |

FIGURE 9a

PRODUCT CONTROL MATRIX 3

| 401-1 STAGE 1 DESIGN | | STAGE 2 ENGINEERING SAMPLES 401-2 | |
|---|---|---|---|
| 1 | Process Qual I | 11 | Process Qual II |
|   |   | 12 | Mask Index Issued |
|   |   | 13 | Mask Set Fab Acc'd |
| 2 | Design Review | 14 | Design Verification |
|   |   | 15 | Design Re-Simulation |
| 3 | Characterization I | 16 |   |
| 4 | Test Plan | 17 |   |
| 5 | Die Package Submission | 18 | Assy. Process Doc. |
|   |   | 19 | Package Outline |
| 6 |   |   |   |
|   |   | 20 | Manufacturing Logistics Plan |
|   |   | 21 | Records Plan |
| 7 | Product Control Team |   |   |
| 8 | Statistical Process Mgt. I | 22 | Statistical Process Mgt II |
| 9 | Product Performance Plan I | 23 | Product Performance |
| 10 |   | 24 | Package Qual II (Review) |
|   |   | 25 | Product Qual I |
|   |   | 26 | Rel Monitor I |
|   |   | 27 | R. F. B. Approved |
|   |   | 28 | Advance Data Sheet |
| 406-1 Prod. Mgr/Quality App'd | | App'd 406-2 | |
| Nomen/Ship | "DS" | "ES" | |
| Mark | 1st | "ES" | |
| Revenue | Mask | No (Except Acknowledged) | |
| Warranty | Set | No | |

FIGURE 9b

PRODUCT CONTROL MATRIX 3 (Cont.)

| 401-3 STAGE 3 DEVELOPMENT PRODUCT | | 401-4 STAGE 4 STANDARD COMMERCIAL PRODUCT | |
|---|---|---|---|
| 29 Process Qual III | | | |
| | | 44 Test Programs Class 11 | |
| 30 Characterization III | | 45 Characterization IV | |
| 31 Test Programs Released | | 46 Test Programs Rev. Cntrl | |
| 32 Quality Assur. Tests Started | | | |
| 33 Build Sheet Released | | | |
| 34 | | | |
| 35 | | | |
| 36 Marking Requs. Def. (Review) | | | |
| | | 47 ECN Established | |
| | | 48 Passport/Spec Audit | |
| 37 Statistical Process Mgt. III | | 49 Statistical Process Mgt IV | |
| 38 | | 50 Product Performance IV | |
| 39 Package Qual III (Review) | | | |
| 40 Product Qual II | | 51 Product Qual III | |
| 41 Rel Monitor II | | 52 Rel Monitor III | |
| 42 Proc. Spec ("DV") | | 53 Proc. Spec ("STD") | |
| 43 Preliminary Data Sheet | | 54 Final Data Sheet | |
| 406-3 App'd | | 406-4 App'd | |
| "DV" | | "PR" | |
| "DV" | | STD | |
| YES | | YES | |
| YES | | YES | |

FIGURE 9c

PRODUCT CONTROL MATRIX 3 (Cont.)

| 401-5 STAGE 5<br>MILITARY PRODUCT | | 401-6 STAGE 6<br>ALERT CONTROL | |
|---|---|---|---|
| | | 67 RMP Failure | |
| | | 68 Field Failure | |
| | | 69 Out of Control SPC | |
| | | 70 Baseline (Passport) Changes | |
| 55 Test Programs Class 11 (Mil) | | | |
| 56 Characterization V | | | |
| 57 Test Progs. Rev. Cntrl. (Mil) | | | |
| | | | |
| | | | |
| | | | |
| | | | |
| | | | |
| | | | |
| 58 APL/CPL App'd | | | |
| 59 E. C. N. (Mil) | | | |
| 60 Passport (Mil) | | | |
| 61 Statistical Process Mgt. V | | | |
| 62 Product Performance V (Mil) | | | |
| 63 Product Qual IV | | | |
| 64 Rel Monitor IV | | | |
| 65 (Mil Mark/Temp) | | | |
| 66 Military Data Sheet | | | |
| /////App'd///// 406-5 | | /////App'd///// 406-6 | |
| "PR" + APL/CPL | | | |
| STD. MIL. | | | |
| YES | | | |
| YES | | | |

FIGURE 10a

PRODUCT CONTROL MATRIX 4

| 401-1 STAGE 1 DESIGN | | STAGE 2 401-2 ENGINEERING SAMPLES | |
|---|---|---|---|
| 1 | Process Qual I | 11 | Process Qual II |
| | | 12 | Mask Index Issued |
| | | 13 | Mask Set Fab Acc'd |
| 2 | Design Review (Review) | 14 | Design Verification |
| | | 15 | Design Re-Simulation |
| 3 | Characterization I | 16 | Characterization II |
| 4 | Test Plan | 17 | Test Flow Doc. |
| 5 | Die Package Submission | 18 | Assy. Process Doc. |
| | | 19 | Package Outline |
| 6 | Packing Design | | |
| | | 20 | Manufacturing Logistics Plan |
| | | 21 | Records Plan |
| 7 | Product Control Team | | |
| 8 | Statistical Process Mgt. I | 22 | Statistical Process Mgt II |
| 9 | Product Performance Plan I | 23 | Product Performance |
| 10 | Package Qual I | 24 | Package Qual II |
| | | 25 | Product Qual I |
| | | 26 | Rel Monitor I |
| | | 27 | R. F. B. Approved |
| | | 28 | |
| 406-1 Prod. Mgr/Quality App'd | | App'd 406-2 | |
| Nomen/Ship | "DS" | "ES" | |
| Mark | 1st | "ES" | |
| Revenue | Mask | No (Except Acknowledged) | |
| Warranty | Set | No | |

FIGURE 10b

PRODUCT CONTROL MATRIX 4 (Cont.)

| 401-3 STAGE 3<br>DEVELOPMENT PRODUCT | | 401-4 STAGE 4<br>STANDARD COMMERCIAL PRODUCT | |
|---|---|---|---|
| 29 | Process Qual III | | |
| | | | |
| | | | |
| | | 44 | Test Programs Class II |
| 30 | Characterization III | 45 | Characterization IV |
| 31 | Test Programs Released | 46 | Test Programs Rev. Cntrl |
| 32 | Quality Assur. Tests Started | | |
| 33 | Build Sheet Released | | |
| | | | |
| 34 | Packing Defined | | |
| 35 | Visual/Mechanical Requs. Defined | | |
| 36 | Marking Requs. Defined | | |
| | | | |
| | | | |
| | | 47 | ECN Established |
| | | 48 | Passport/Spec Audit |
| 37 | Statistical Process Mgt. III | 49 | Statistical Process Mgt IV |
| 38 | Product Performance III | 50 | Product Performance IV |
| 39 | Package Qual III | | |
| 40 | Product Qual II | 51 | Product Qual III |
| 41 | Rel Monitor II | 52 | Rel Monitor III |
| 42 | Proc. Spec ("DV") | 53 | Proc. Spec ("STD") |
| 43 | | 54 | Final Data Sheet |
| //406-3// App'd// | | //406-4// App'd// | |
| | "DV" | | "PR" |
| | "DV" | | STD |
| | YES | | YES |
| | YES | | YES |

FIGURE 10c

PRODUCT CONTROL MATRIX 4 (Cont.)

| 401-5 STAGE 5 MILITARY PRODUCT | | | STAGE 6 401-6 ALERT CONTROL | |
|---|---|---|---|---|
| | | 67 | RMP Failure | |
| | | 68 | Field Failure | |
| | | 69 | Out of Control SPC | |
| | | 70 | Baseline (Passport) Changes | |
| 55 Test Programs Class 11 (Mil) | | | | |
| 56 Characterization V | | | | |
| 57 Test Progs. Rev. Cntrl. (Mil) | | | | |
| | | | | |
| | | | | |
| | | | | |
| | | | | |
| | | | | |
| 58 APL/CPL App'd | | | | |
| | | | | |
| 59 E. C. N. (Mil) | | | | |
| 60 Passport (Mil) | | | | |
| 61 Statistical Process Mgt. V | | | | |
| 62 Product Performance V (Mil) | | | | |
| | | | | |
| 63 Product Qual IV | | | | |
| 64 Rel Monitor IV | | | | |
| 65 (Mil Mark/Temp) | | | | |
| 66 Military Data Sheet | | | | |
| /////App'd///// 406-5 | | | /////App'd///// 406-6 | |
| "PR" + APL/CPL | | | | |
| STD. MIL. | | | | |
| YES | | | | |
| YES | | | | |

FIGURE 11a

PRODUCT CONTROL MATRIX 5

| 401-1 STAGE 1 DESIGN | | STAGE 2 ENGINEERING SAMPLES 401-2 | |
|---|---|---|---|
| 1 | | 11 | |
| | | 12 | Mask Index Issued |
| | | 13 | Mask Set Fab Acc'd |
| 2 | Design Review | 14 | Design Verification |
| | | 15 | Design Re-Simulation |
| 3 | Characterization I | 16 | Characterization II |
| 4 | Test Plan | 17 | Test Flow Doc. |
| 5 | Die Package Submission | 18 | |
| | | 19 | |
| 6 | | | |
| | | 20 | Manufacturing Logistics Plan |
| | | 21 | Records Plan |
| 7 | Product Control Team | | |
| 8 | Statistical Process Mgt. I | 22 | Statistical Process Mgt II |
| 9 | Product Performance Plan I | 23 | Product Performance |
| 10 | Package Qual I (Review) | 24 | Package Qual II (Review) |
| | | 25 | Product Qual I |
| | | 26 | Rel Monitor I |
| | | 27 | R. F. B. Approved |
| | | 28 | |
| 406-1 Prod. Mgr/Quality App'd | | App'd 406-2 | |
| Nomen/Ship | "DS" | | "ES" |
| Mark | 1st | | "ES" |
| Revenue | Mask | | No (Except Acknowledged) |
| Warranty | Set | | No |

FIGURE 11b

PRODUCT CONTROL MATRIX 5 (Cont.)

| 401-3 | STAGE 3 DEVELOPMENT PRODUCT | | STAGE 4 STANDARD COMMERCIAL PRODUCT | 401-4 |
|---|---|---|---|---|
| 29 | | | | |
| | | 44 | Test Programs Class 11 | |
| 30 | Characterization III | 45 | Characterization IV | |
| 31 | Test Programs Released | 46 | Test Programs Rev. Cntrl | |
| 32 | Quality Assur. Tests Started | | | |
| 33 | Build Sheet Released | | | |
| 34 | | | | |
| 35 | | | | |
| 36 | Marking Requs. Def. (Review) | | | |
| | | 47 | ECN Established | |
| | | 48 | Passport/Spec Audit | |
| 37 | Statistical Process Mgt. III | 49 | Statistical Process Mgt IV | |
| 38 | Product Performance III | 50 | Product Performance IV | |
| 39 | Package Qual III (Review) | | | |
| 40 | Product Qual II | 51 | Product Qual III | |
| 41 | Rel Monitor II | 52 | Rel Monitor III | |
| 42 | Proc. Spec ("DV") | 53 | Proc. Spec ("STD") | |
| 43 | | 54 | Final Data Sheet | |
| //406-3//App'd// | | //406-4//App'd// | | |
| | "DV" | | "PR" | |
| | "DV" | | STD | |
| | YES | | YES | |
| | YES | | YES | |

FIGURE 11c

PRODUCT CONTROL MATRIX 5 (Cont.)

| 401-5 | STAGE 5<br><br>MILITARY<br>PRODUCT | | STAGE 6  401-6<br><br>ALERT<br>CONTROL | |
|---|---|---|---|---|
| | | | 67 RMP Failure | |
| | | | 68 Field Failure | |
| | | | 69 Out of Control SPC | |
| | | | 70 Baseline (Passport) Changes | |
| | 55 Test Programs Class 11 (Mil) | | | |
| | 56 Characterization V | | | |
| | 57 Test Progs. Rev. Cntrl. (Mil) | | | |
| | | | | |
| | | | | |
| | | | | |
| | | | | |
| | | | | |
| | 58 APL/CPL App'd | | | |
| | | | | |
| | 59 E. C. N. (Mil) | | | |
| | 60 Passport (Mil) | | | |
| | 61 Statistical Process Mgt. V | | | |
| | 62 Product Performance V (Mil) | | | |
| | | | | |
| | 63 Product Qual IV | | | |
| | 64 Rel Monitor IV | | | |
| | 65 (Mil Mark/Temp) | | | |
| | 66 Military Data Sheet | | | |
| | ///////App'd///////406-5 | | ///////App'd///////406-6 | |
| | "PR" + APL/CPL | | | |
| | STD. MIL. | | | |
| | YES | | | |
| | YES | | | |

FIGURE 12a

PRODUCT CONTROL MATRIX 6

| 401-1 STAGE 1 DESIGN | | STAGE 2 ENGINEERING SAMPLES 401-2 | |
|---|---|---|---|
| 1 | | 11 | |
| | | 12 | |
| | | 13 | |
| 2 Design Review (Review) | | 14 Design Verification (Review) | |
| | | 15 Design Re-Simulation (Review) | |
| 3 Characterization I | | 16 Characterization II | |
| 4 Test Plan | | 17 Test Flow Doc. | |
| 5 Die Package Submission | | 18 Assy. Process Doc. | |
| | | 19 Package Outline | |
| 6 Packing Design | | | |
| | | 20 Manufacturing Logistics Plan | |
| | | 21 Records Plan | |
| 7 Product Control Team | | | |
| 8 Statistical Process Mgt. I | | 22 Statistical Process Mgt II | |
| 9 Product Performance Plan I | | 23 Product Performance | |
| 10 Package Qual I | | 24 Package Qual II | |
| | | 25 Product Qual I | |
| | | 26 Rel Monitor I | |
| | | 27 R. F. B. Approved | |
| | | 28 | |
| 406-1 Prod. Mgr/Quality App'd | | App'd 406-2 | |
| Nomen/Ship "DS" | | "ES" | |
| Mark 1st | | "ES" | |
| Revenue Mask | | No (Except Acknowledged) | |
| Warranty Set | | No | |

FIGURE 12b

PRODUCT CONTROL MATRIX 6 (Cont.)

| 401-3 STAGE 3 DEVELOPMENT PRODUCT | | 401-4 STAGE 4 STANDARD COMMERCIAL PRODUCT | |
|---|---|---|---|
| 29 | | | |
| | | 44 | |
| 30 Characterization III | | 45 Characterization IV | |
| 31 Test Programs Released | | 46 Test Programs Rev. Cntrl | |
| 32 Quality Assur. Tests Started | | | |
| 33 Build Sheet Released | | | |
| 34 Packing Defined | | | |
| 35 Visual/Mechanical Requs. Defined | | | |
| 36 Marking Requs. Defined | | | |
| | | 47 ECN Established | |
| | | 48 Passport/Spec Audit | |
| 37 Statistical Process Mgt. III | | 49 Statistical Process Mgt IV | |
| 38 Product Performance III | | 50 Product Performance IV | |
| 39 Package Qual III | | | |
| 40 Product Qual II | | 51 Product Qual III | |
| 41 Rel Monitor II | | 52 Rel Monitor III | |
| 42 Proc. Spec ("DV") | | 53 Proc. Spec ("STD") | |
| 43 | | 54 Final Data Sheet | |
| //406-3// App'd //////// | | //406-4// App'd //////// | |
| "DV" | | "PR" | |
| "DV" | | STD | |
| YES | | YES | |
| YES | | YES | |

FIGURE 12c

PRODUCT CONTROL MATRIX 6 (Cont.)

| 401-5 STAGE 5<br>MILITARY<br>PRODUCT | STAGE 6  401-6<br>ALERT<br>CONTROL |
|---|---|
| | 67 RMP Failure |
| | 68 Field Failure |
| | 69 Out of Control SPC |
| | 70 Baseline (Passport) Changes |
| 55 Test Programs Class 11 (Mil) | |
| 56 Characterization V | |
| 57 Test Progs. Rev. Cntrl. (Mil) | |
| | |
| 58 APL/CPL App'd | |
| 59 E. C. N. (Mil) | |
| 60 Passport (Mil) | |
| 61 Statistical Process Mgt. V | |
| 62 Product Performance V (Mil) | |
| 63 Product Qual IV | |
| 64 Rel Monitor IV | |
| 65 (Mil Mark/Temp) | |
| 66 Military Data Sheet | |
| //////App'd////// 406-5 | //////App'd////// 406-6 |
| "PR" + APL/CPL | |
| STD. MIL. | |
| YES | |
| YES | |

FIGURE 13a

PRODUCT CONTROL MATRIX 7

| 401-1 | STAGE 1 DESIGN | | STAGE 2 ENGINEERING SAMPLES | 401-2 |
|---|---|---|---|---|
| 1 | Process Qual I | 11 | Process Qual II | |
| | | 12 | Mask Index Issued | |
| | | 13 | Mask Set Fab Acc'd | |
| 2 | Design Review (Review) | 14 | Design Verification | |
| | | 15 | Design Re-Simulation (Review) | |
| 3 | Characterization I | 16 | Characterization II | |
| 4 | | 17 | | |
| 5 | | 18 | | |
| | | 19 | | |
| 6 | | | | |
| | | 20 | Manufacturing Logistics Plan | |
| | | 21 | Records Plan | |
| 7 | Product Control Team | | | |
| 8 | Statistical Process Mgt. I | 22 | Statistical Process Mgt II | |
| 9 | Product Performance Plan I | 23 | Product Performance | |
| 10 | | 24 | | |
| | | 25 | Product Qual I | |
| | | 26 | Rel Monitor I | |
| | | 27 | | |
| | | 28 | | |
| 406-1 | Prod. Mgr/Quality App'd | | App'd | 406-2 |
| | Nomen/Ship "DS" | | "ES" | |
| | Mark 1st | | "ES" | |
| | Revenue Mask | | No (Except Acknowledged) | |
| | Warranty Set | | No | |

FIGURE 13b

PRODUCT CONTROL MATRIX 7 (Cont.)

| 401-3 | STAGE 3 DEVELOPMENT PRODUCT | | STAGE 4 STANDARD COMMERCIAL PRODUCT | 401-4 |
|---|---|---|---|---|
| 29 | Process Qual III | | | |
| | | | | |
| | | | | |
| | | 44 | | |
| 30 | Characterization III | 45 | Characterization IV | |
| 31 | | 46 | | |
| 32 | | | | |
| 33 | | | | |
| | | | | |
| 34 | | | | |
| 35 | | | | |
| 36 | | | | |
| | | | | |
| | | 47 | | |
| | | 48 | Passport/Spec Audit | |
| 37 | Statistical Process Mgt. III | 49 | Statistical Process Mgt IV | |
| 38 | Product Performance III | 50 | Product Performance IV | |
| 39 | | | | |
| 40 | Product Qual II | 51 | Product Qual III | |
| 41 | Rel Monitor II | 52 | Rel Monitor III | |
| 42 | | 53 | | |
| 43 | | 54 | | |
| 406-3 | App'd | | 406-4 App'd | |
| | "DV" | | "PR" | |
| | "DV" | | STD | |
| | YES | | YES | |
| | YES | | YES | |

FIGURE 13c

PRODUCT CONTROL MATRIX 7 (Cont.)

| 401-5 | STAGE 5<br>MILITARY<br>PRODUCT | | STAGE 6<br>ALERT<br>CONTROL | 401-6 |
|---|---|---|---|---|
| | | 67 | RMP Failure | |
| | | 68 | Field Failure | |
| | | 69 | Out of Control SPC | |
| | | 70 | Baseline (Passport) Changes | |
| 55 | | | | |
| 56 | Characterization V | | | |
| 57 | | | | |
| | | | | |
| | | | | |
| | | | | |
| | | | | |
| | | | | |
| | | | | |
| 58 | APL/CPL App'd | | | |
| 59 | | | | |
| 60 | Passport (Mil) | | | |
| 61 | Statistical Process Mgt. V | | | |
| 62 | Product Performance V (Mil) | | | |
| 63 | Product Qual IV | | | |
| 64 | Rel Monitor IV | | | |
| 65 | | | | |
| 66 | | | | |
| ////////App'd////// | 406-5 | ////////App'd////// | 406-6 | |
| | "PR" + APL/CPL | | | |
| | STD. MIL. | | | |
| | YES | | | |
| | YES | | | |

FIGURE 14a

PRODUCT CONTROL MATRIX 8

| 401-1 STAGE 1 DESIGN | | STAGE 2 ENGINEERING SAMPLES 401-2 | |
|---|---|---|---|
| 1 | | 11 | |
| | | 12 Mask Index Issued | |
| | | 13 Mask Set Fab Acc'd | |
| 2 Design Review | | 14 Design Verification | |
| | | 15 Design Re-Simulation | |
| 3 Characterization I | | 16 Characterization II | |
| 4 Test Plan | | 17 Test Flow Doc. | |
| 5 Die Package Submission | | 18 | |
| | | 19 | |
| 6 | | | |
| | | 20 Manufacturing Logistics Plan | |
| | | 21 Records Plan | |
| 7 Product Control Team | | | |
| 8 Statistical Process Mgt. I | | 22 Statistical Process Mgt II | |
| 9 Product Performance Plan I | | 23 Product Performance | |
| 10 Package Qual I (Review) | | 24 Package Qual II (Review) | |
| | | 25 Product Qual I | |
| | | 26 Rel Monitor I | |
| | | 27 R. F. B. Approved | |
| | | 28 Advance Data Sheet | |
| //406-1 Prod. Mgr/Quality App'd// | | ////////App'd///////406-2 | |
| Nomen/Ship | "DS" | "ES" | |
| Mark | 1st | "ES" | |
| Revenue | Mask | No (Except Acknowledged) | |
| Warranty | Set | No | |

FIGURE 14b

PRODUCT CONTROL MATRIX 8 (Cont.)

| 401-3 | STAGE 3 DEVELOPMENT PRODUCT | | STAGE 4 STANDARD COMMERCIAL PRODUCT | 401-4 |
|---|---|---|---|---|
| 29 | | | | |
| | | 44 | Test Programs Class 11 | |
| 30 | Characterization III | 45 | Characterization IV | |
| 31 | Test Programs Released | 46 | Test Programs Rev. Cntrl | |
| 32 | Quality Assur. Tests Started | | | |
| 33 | Build Sheet Released | | | |
| 34 | | | | |
| 35 | | | | |
| 36 | Marking Requs. Def. (Review) | | | |
| | | 47 | ECN Established | |
| | | 48 | Passport/Spec Audit | |
| 37 | Statistical Process Mgt. III | 49 | Statistical Process Mgt IV | |
| 38 | Product Performance III | 50 | Product Performance IV | |
| 39 | Package Qual III (Review) | | | |
| 40 | Product Qual II | 51 | Product Qual III | |
| 41 | Rel Monitor II | 52 | Rel Monitor III | |
| 42 | Proc. Spec ("DV") | 53 | Proc. Spec ("STD") | |
| 43 | Preliminary Data Sheet | 54 | Final Data Sheet | |
| 406-3 | App'd | 406-4 | App'd | |
| | "DV" | | "PR" | |
| | "DV" | | STD | |
| | YES | | YES | |
| | YES | | YES | |

FIGURE 14c

PRODUCT CONTROL MATRIX 8 (Cont.)

| 401-5 | STAGE 5<br>MILITARY<br>PRODUCT | | | STAGE 6<br>ALERT<br>CONTROL | 401-6 |
|---|---|---|---|---|---|
| | | | 67 | RMP Failure | |
| | | | 68 | Field Failure | |
| | | | 69 | Out of Control SPC | |
| | | | 70 | Baseline (Passport) Changes | |
| 55 | Test Programs Class 11 (Mil) | | | | |
| 56 | Characterization V | | | | |
| 57 | Test Progs. Rev. Cntrl. (Mil) | | | | |
| | | | | | |
| | | | | | |
| | | | | | |
| | | | | | |
| | | | | | |
| | | | | | |
| 58 | APL/CPL App'd | | | | |
| | | | | | |
| 59 | E. C. N. (Mil) | | | | |
| 60 | Passport (Mil) | | | | |
| 61 | Statistical Process Mgt. V | | | | |
| 62 | Product Performance V (Mil) | | | | |
| | | | | | |
| 63 | Product Qual IV | | | | |
| 64 | Rel Monitor IV | | | | |
| 65 | (Mil Mark/Temp) | | | | |
| 66 | Military Data Sheet | | | | |
| ////// | App'd ////// 406-5 | | ////// | App'd ////// | 406-6 |
| | "PR" + APL/CPL | | | | |
| | STD. MIL. | | | | |
| | YES | | | | |
| | YES | | | | |

FIGURE 15a

PRODUCT CONTROL MATRIX 9

| 401-1 | STAGE 1<br><br>DESIGN | | | STAGE 2<br><br>ENGINEERING<br>SAMPLES | 401-2 |
|---|---|---|---|---|---|
| 1 | | | 11 | | |
| | | | 12 | Mask Index Issued | |
| | | | 13 | Mask Set Fab Acc'd | |
| 2 | Design Review | | 14 | Design Verification | |
| | | | 15 | Design Re-Simulation | |
| 3 | Characterization I | | 16 | Characterization II | |
| 4 | Test Plan | | 17 | Test Flow Doc. | |
| 5 | Die Package Submission | | 18 | | |
| | | | 19 | | |
| 6 | | | | | |
| | | | 20 | Manufacturing Logistics Plan | |
| | | | 21 | Records Plan | |
| 7 | Product Control Team | | | | |
| 8 | Statistical Process Mgt. I | | 22 | Statistical Process Mgt II | |
| 9 | Product Performance Plan I | | 23 | Product Performance | |
| 10 | | | 24 | | |
| | | | 25 | Product Qual I | |
| | | | 26 | Rel Monitor I | |
| | | | 27 | R. F. B. Approved | |
| | | | 28 | Advance Data Sheet | |
| 406-1 | Prod. Mgr/Quality App'd | | | App'd | 406-2 |
| | Nomen/Ship "DS" | | | "ES" | |
| | Mark 1st | | | "ES" | |
| | Revenue Mask | | | No (Except Acknowledged) | |
| | Warranty Set | | | No | |

FIGURE 15b

PRODUCT CONTROL MATRIX 9 (Cont.)

| 401-3 | STAGE 3 DEVELOPMENT PRODUCT | | STAGE 4 STANDARD COMMERCIAL PRODUCT | 401-4 |
|---|---|---|---|---|
| 29 | | | | |
| | | | | |
| | | | | |
| | | 44 | Test Programs Class 11 | |
| 30 | Characterization III | 45 | Characterization IV | |
| 31 | Test Programs Released | 46 | Test Programs Rev. Cntrl | |
| 32 | Quality Assur. Tests Started | | | |
| 33 | Build Sheet Released | | | |
| 34 | | | | |
| 35 | | | | |
| 36 | Marking Requs. Def. (Review) | | | |
| | | | | |
| | | | | |
| | | 47 | ECN Established | |
| | | 48 | Passport/Spec Audit | |
| 37 | Statistical Process Mgt. III | 49 | Statistical Process Mgt IV | |
| 38 | Product Performance III | 50 | Product Performance IV | |
| 39 | | | | |
| 40 | Product Qual II | 51 | Product Qual III | |
| 41 | Rel Monitor II | 52 | Rel Monitor III | |
| 42 | Proc. Spec ("DV") | 53 | Proc. Spec ("STD") | |
| 43 | Preliminary Data Sheet | 54 | Final Data Sheet | |
| | 406-3 App'd | | 406-4 App'd | |
| | "DV" | | "PR" | |
| | "DV" | | STD | |
| | YES | | YES | |
| | YES | | YES | |

FIGURE 15c

PRODUCT CONTROL MATRIX 9 (Cont.)

| 401-5 | STAGE 5 MILITARY PRODUCT | | STAGE 6 ALERT CONTROL | 401-6 |
|---|---|---|---|---|
| | | | 67 RMP Failure | |
| | | | 68 Field Failure | |
| | | | 69 Out of Control SPC | |
| | | | 70 Baseline (Passport) Changes | |
| | 55 Test Programs Class 11 (Mil) | | | |
| | 56 Characterization V | | | |
| | 57 Test Progs. Rev. Cntrl. (Mil) | | | |
| | | | | |
| | | | | |
| | | | | |
| | | | | |
| | | | | |
| | 58 APL/CPL App'd | | | |
| | | | | |
| | 59 E. C. N. (Mil) | | | |
| | 60 Passport (Mil) | | | |
| | 61 Statistical Process Mgt. V | | | |
| | 62 Product Performance V (Mil) | | | |
| | | | | |
| | 63 Product Qual IV | | | |
| | 64 Rel Monitor IV | | | |
| | 65 (Mil Mark/Temp) | | | |
| | 66 Military Data Sheet | | | |
| | //////App'd////// 406-5 | | //////App'd////// 406-6 | |
| | "PR" + APL/CPL | | | |
| | STD. MIL. | | | |
| | YES | | | |
| | YES | | | |

COMPUTER-BASED METHOD AND SYSTEM FOR PRODUCT DEVELOPMENT

BACKGROUND OF THE INVENTION

1. Field of the Invention

This invention relates generally to computer tracking of manufacturing and in particular to a computer-based method for monitoring product development and/or manufacturing to assure profitable manufacture of a functional, reliable, and quality product.

2. Prior Art of the Invention

The manufacturing of a product, in particular a semiconductor product, includes a multiplicity of operations. Typically, each group involved in the manufacturing process performs only the operations associated with that group. For example, a design group performs the operations required to generate the design for the new product.

Historically, the design group worked independently and provided the new product design to a product group that used the design to build engineering samples. The product group determined that the engineering samples functioned satisfactorily, and turned the product over to the manufacturing groups The manufacturing groups were responsible for volume production of the product.

Each of the groups in the manufacturing process was potentially unaware of the problems associated with the operations of the other groups. For example, the manufacturing groups often did not learn of the manufacturing requirements of a new product until the product was released by the product group. Thus, not only did the manufacturing groups fail to schedule logistically for volume production, but also the product group and design group may have implemented features in the product which were not amenable to volume production. Similarly, both the design and product groups may have failed to provide a means for effective operational testing of mass produced units.

The result of this manufacturing approach was that frequently the released product was at best an incompletely tested sample. In fact, this manufacturing approach frequently results in products that are unmanufacturable or unprofitable, unreliable or of poor quality, undeliverable, or any combination of these factors. If the product suffers from any one of these defects there are profound negative effects on both the manufacturer and the customer. Announcements that early releases of microprocessors have hardware defects that require either design around or redesign are one example of this problem.

This method of product development evolved from small start-up companies where the various groups consisted of a small number of people easily able to communicate with each other. The required decisions associated with the development of a manufacturable product were made by persons with knowledge and understanding of the operations performed by others within the company. However, as the companies have grown, the various groups associated with the development of a manufacturable product are now largely independent and there is a need for integration of the requirements of the various groups in overall product development. Thus, decisions are made and products developed without consideration of limitations or needs of other groups within the manufacturing process. Thus, the potential result is not only reduced product operability and reliability, but also possibly an adverse effect on profitability, quality, and manufacturability. Further, there is not a systematized body of knowledge, that completely defines the product development.

In the absence of a systematic, communicable and accessible program for product release, it is virtually impossible to ascertain for a given product whether the product is one which has been adequately designed, tested, and fabricated or whether the product is in reality still at the sample stage. This uncertainty in released product performance erodes confidence in all products and not just those that were prematurely released. Thus, a method is needed for assuring intrinsic manufacturability, quality, reliability and profitability, when a product is released to the customer. Moreover, a method is needed for documenting the detailed development of each product so that problems encountered later in the product's lifetime may easily be rectified

SUMMARY OF THE INVENTION

This invention provides a method and system of monitoring product development. In accordance with this invention, product development is divided into a plurality of stages where each stage is capable of being reviewed, typically, though not necessarily, on a display unit of a computer system. Each stage includes a set of requirements defining the product development operations in that stage which must be satisfied to complete that stage. Each requirement has both a unique identifier and an indicium which is capable of indicating the completion status of that requirement. As each requirement is completed the status of that requirement is changed to so indicate. Consequently the status of the product development is indicated by the number of requirements shown as complete. The data necessary to complete, and the details of, each requirement are also capable of being displayed.

In a preferred embodiment, the invention is implemented on a computer system. One embodiment employs a DEC VAX computer with workstations and/or personal computers interconnected by a wide area network. Thus data necessary to implement this invention is input to the DEC VAX computer from terminals adjacent to work areas in which the development work on the product is being carried out.

BRIEF DESCRIPTION OF THE DRAWINGS

FIG. 1 illustrates a product control matrix according to the principles of this invention.

FIGS. 7a through 7c illustrate an embodiment of the product control matrix of this invention for a new semiconductor product.

FIGS. 8a through 8c, 9a through 9c, 10a through 10c, 11a through 11c, 12a through 12c, 13a through 13c, 14a through 14c, and 15a through 15c depict various product control matrices used in conjunction with this invention to reflect different permutations of activities required in conjunction with the initial development status of semiconductor products.

Figure 2:
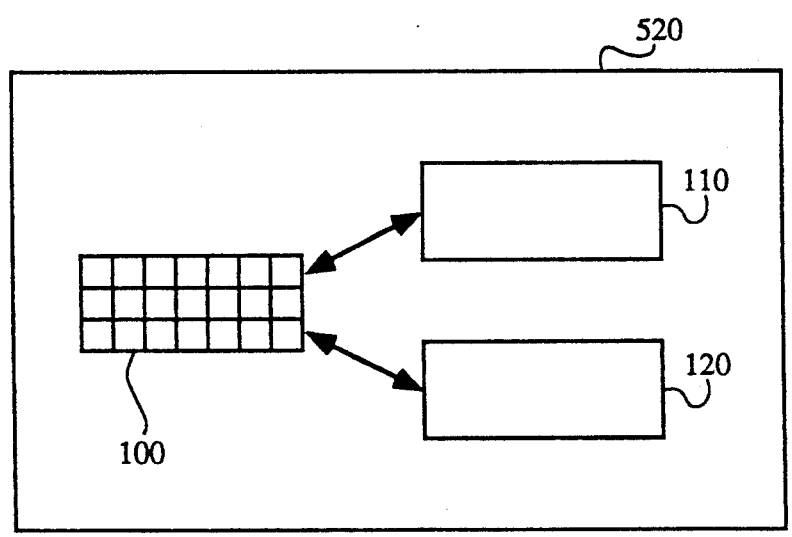
FIG. 2 illustrates schematically product control matrix and related databases of this invention in a computer system.

In the drawings, similar features in each part of the product control matrix have a common base reference numeral. To distinguish between similar features in different stages, the base reference numeral is followed by a dash and the number of the stage containing the feature. To further distinguish between similar features within a stage, the stage number is followed by a dash and the similar features are sequentially numbered. When a description refers to any one of the similar features, only the base reference numeral is used as a shorthand notation.

DETAILED DESCRIPTION

The method of this invention utilizes a product control matrix (i) to monitor day-to-day product development, i.e., product tracking, (ii) to provide a means for detailed product documentation, which can be used for gaining customer acceptance of the product, and (iii) to provide controlled predictable manufacturing throughout the product production life. The product control matrix is a control center, preferably maintained in a computer system but also maintainable in other ways, such as in a file system, for:

indicating the status of product development and/or product production;
  integrating the operations in product development and/or product production;
  denoting the stages in product development/production and the requirements within each stage;
  providing a uniform set of requirements for the development/production of all products; and
  generating detailed documentation describing the development, testing, functionality, reliability, features and capabilities of each product.

Figure 1:
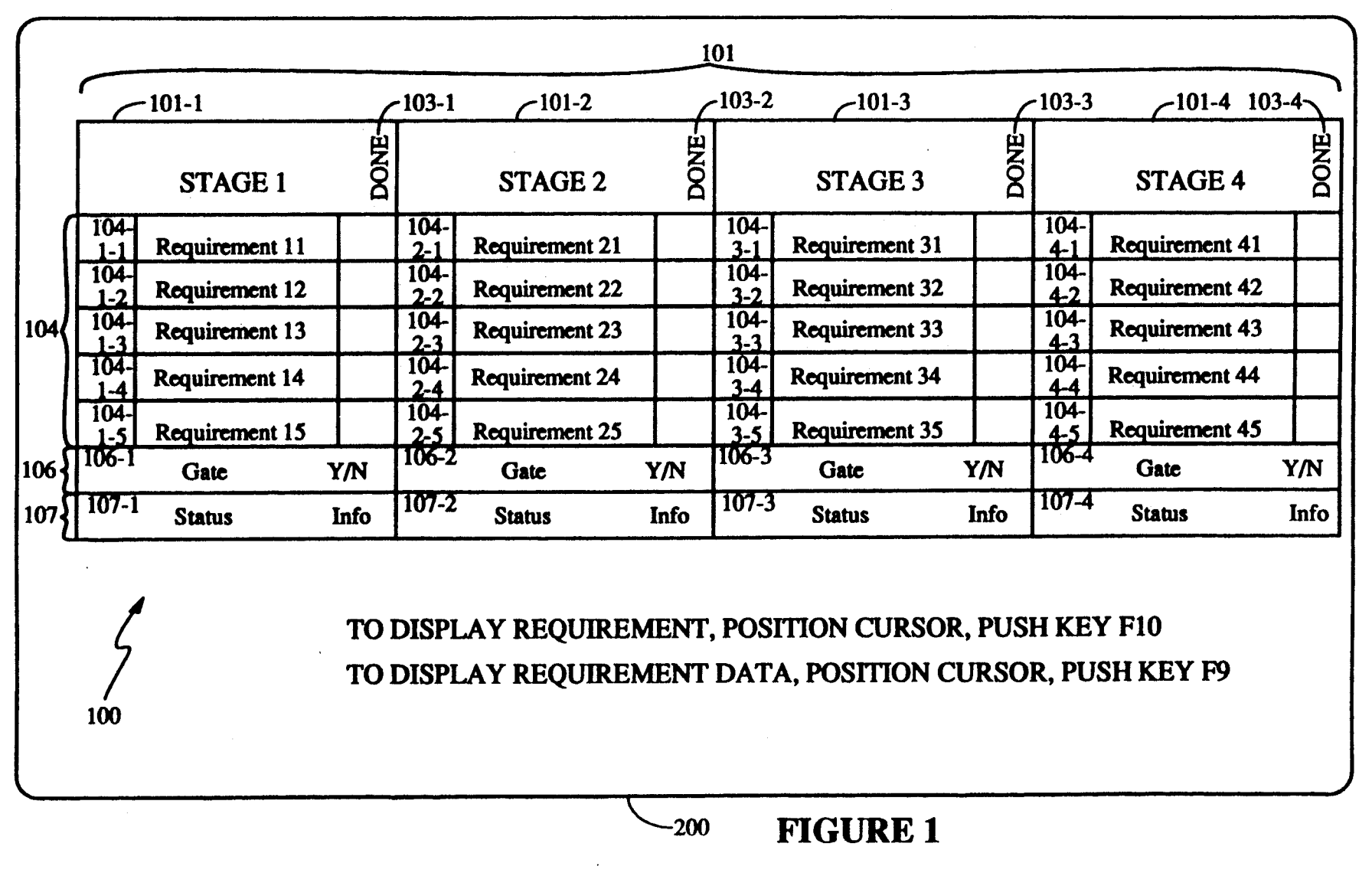

Product control matrix 100 of this invention (FIG. 1) has a multiplicity of stages, shown to be four stages 101-1 through 101-4 in FIG. 1. Of course, additional stages can be used if desired. Each stage is subdivided into requirements 104. In FIG. 1, an identifier (such as number 11 or 15 as shown in Stage 1) is provided for each requirement. Requirements 104 in each stages 101-1 through 101-4 define the minimum requirements set of engineering functions that must be successfully accomplished to ensure rapid introduction and controlled predictable manufacturing of a reliable high quality product. For ease of illustration, each of stages 101-1 through 101-4 (FIG. 1) includes the same number of requirements 104. However, in practice, the number of requirements in each stage may be different.

After the list of requirements 104 in each stage 101 is a gate 106. Gate 106 is a control mechanism for assuring that all requirements 104 in the corresponding stage 101 are complete prior to assigning a status, described more completely below, that product in the company's manufacturing systems. In gate 106, the data and the documentation for each requirement in the stage are reviewed. If the data and the documentation satisfy the requirements of that stage, gate 106 is marked open.

Following each gate 106 in product control matrix 100 is a corresponding status information 107. Typically, status information 107 includes several subcategories such as manufacturing status, product marking, product revenue status and product warranty status. The status information is the fundamental reference for the company's production management system.

Product control matrix 100 operates in conjunction with a data and result documentation database 110 (illustrated schematically in FIG. 2) and a requirement description database 120. Product control matrix 100 and databases 110, 120 are maintained in computer system 520. As requirements 104 (FIG. 1) in a stage 100 are completed, the results and the data supporting those results are entered in database 110. Requirement description database 120 (FIG. 2) contains a detailed description of each requirement 104 in product control matrix 100.

Any person desiring to know the status of the product development and/or the product production simply accesses product control matrix 100. Examination of product control matrix 100 immediately informs the person of the requirements that have been completed and the requirements remaining to be performed prior to introduction of the product to market. The person can quickly ascertain any bottlenecks or problems by accessing the description of any incomplete requirement and subsequently contacting the group or groups responsible for the completion of that requirement. In addition, as described more completely below, the person can also access simply and easily the data and results for each of the completed requirements. This permits the person to review and understand the information that is available to the groups that are experiencing bottlenecks and/or problems. Accordingly, product control matrix 100 provides a means for active management and review of product development rather than the relatively uncoordinated and inaccessible operations of the prior art.

Requirements 104 in each stage 101 of product control matrix 100 (FIG. 2) require the planning input and participation of every group involved in the product development cycle well before the time that each group physically performs their specific product development requirements. The integration provided by product control matrix 100 assures that any potential problem or delay in the manufacturing process is identified at the earliest possible time so that the problem can be addressed and remedied without affecting the quality, reliability, timeliness, predictability and profitability of the product introduction to the market.

Data and results database 110 (FIG. 2) may be used in reviewing the status of the product development or alternatively may be printed out in a selected form and used to support customer evaluation and acceptance of the new product.

Since database 110 provides a complete detailed history of the product development, database 110 provides a valuable reference tool for addressing any problems that may be encountered later in the product's lifetime.

Product control matrix 100 (FIG. 1) is displayed, in one embodiment, on a video display screen 200 of computer system 520. Each requirement 104 is provided with a short identifier and with a means for indicating completion of the requirement. As shown in FIG. 1, the completion indicating means, in this embodiment, is a column 103-1, for example, with the title "DONE". The requirement is completed when a "Y", for example, is entered in the column corresponding to the completed requirement.

For each requirement in product control matrix 100 (FIGS. 1 and 2), the description of that requirement is maintained in database 120 (FIG. 2) in computer system 520 with product control matrix 100. To access the description of a particular requirement, the video display screen cursor is positioned over the requirement and the keyboard key indicated on video display screen 200 is pressed. Product control matrix 100 is replaced on video display screen 200 with a description of the selected requirement.

In addition to the description of each requirement, the data generated in completing each requirement is also maintained in database 110 in computer system 520. To review the data for a particular requirement in product control matrix 100, the video display screen cursor is again placed over the requirement and the keyboard key indicated on video display screen 200 is pressed. The product control matrix 100 is replaced on video display screen 200 with the data in database 110 for the selected requirement. All or part of the results and data in database 110 may also be printed with ease at any time for internal use, marketing or any other desired function. In particular, in one embodiment, database 110 for all the requirements in control matrix 100 is printed. This printed document is the product passport. The term "product passport" is used because the document is the means used to gain customer acceptance of the new product by evidencing the detailed engineering process at every development stage.

Thus, product control matrix 100 is a means for monitoring the status of product development. The product control matrix 100 indicates the stages of product development which have completed and within the active stage, the requirements that remain to be completed. Upon completion of all the stages, the data is printed and used to demonstrate the scope and results of the product development. Product control matrix 100 is a means for controlling product development and production so all company groups associated with the product assist in the development and production at a time frame that insures development at the earliest possible date of a fully functional reliable product.

Figure 3:
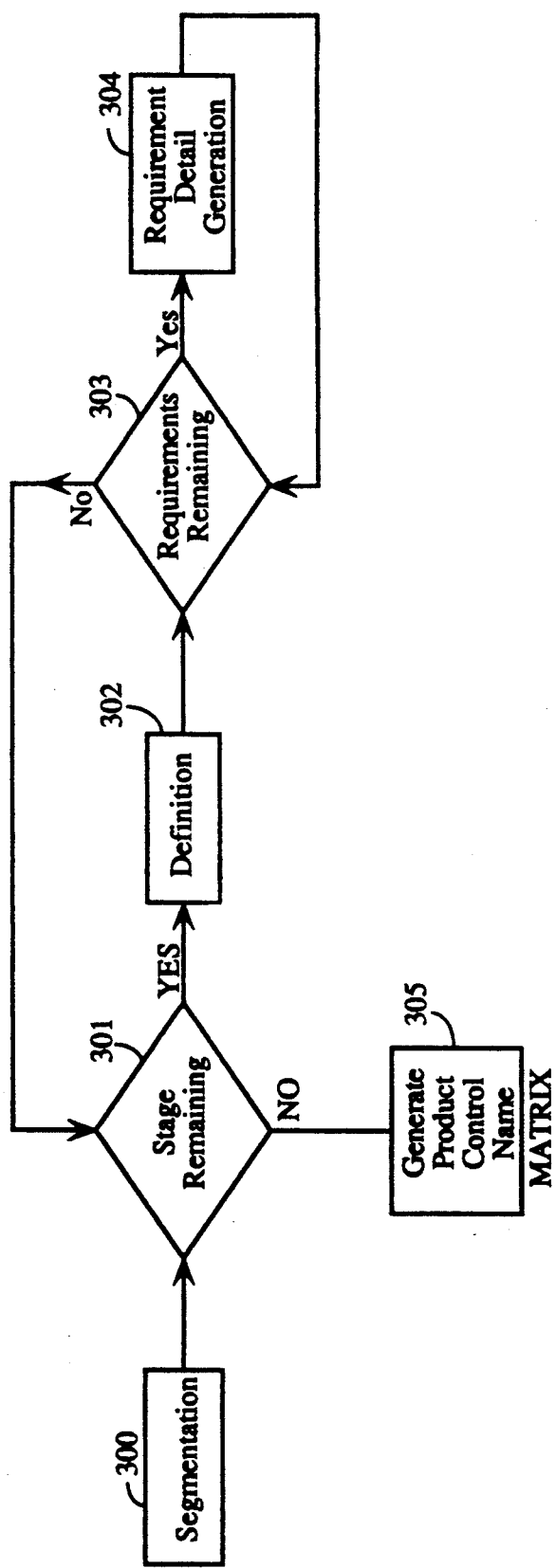
FIG. 3 illustrates one embodiment of a process flow for generating the product control matrix of this invention.
Figure 4:
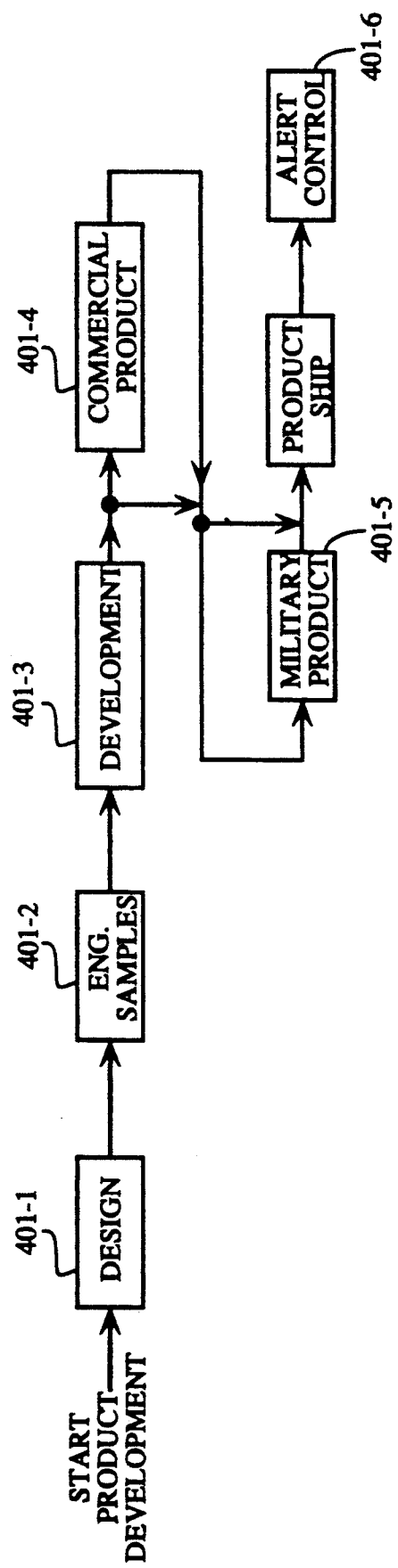
FIG. 4 illustrates the stages of product development for one embodiment of the product control matrix of this invention.

The generation of product control matrix 100 is illustrated in FIG. 3. Initially, the manufacturing process for a new product is segmented into stages in segmentation 300. For example, for a new semiconductor product, the manufacturing process is segmented, in one embodiment, into six stages as shown in FIG. 4. The six stages are design 401-1, engineering samples 401-2, development 401-3, standard product 401-4, military product 401-5, and alert control 401-6. In view of this disclosure, those skilled in the art may segment the manufacturing process into either more than six stages or less than six stages.

The important aspect in segmentation 300 is that stages 401 are selected so that stages 401 are performed sequentially. Also, each stage is typically selected so that the stage corresponds to one complete phase of the product development and/or production status. Within each stage, as explained more completely below, the requirements set includes not only the minimum engineering functions necessary for successful completion of the subsequent stages but also the sequencing of the engineering functions that ensure the earliest possible time to market of the product. The sequence of engineering functions is also selected so that all of the company resources are used in the most effective and economical way.

Thus, while stages 401 are performed sequentially, stages 401 are not independent. Stages 401 are coupled through the interaction of the requirements in one stage with related requirements in subsequent stages. Also, while stages 401 are performed in sequential order, requirements in different stages 401 may be performed in parallel.

Upon completion of segmentation 300, the process passes through stage remaining test 301 to definition 302. In definition 302, each of the requirements within the stage being processed is defined. The requirements are explained more completely below. Briefly, the requirements within a stage are the product development functions that are required to be completed so as to assure prompt, expeditious, and error free completion of the subsequent stages and consequently the earliest possible introduction of the product to the market. The exact requirements in a stage depend upon the status of the different elements of product development, for example, in the semiconductor industry, the status of fabrication technology, the design technology, and the packaging technology. A product that requires a new design, new fabrication technology, and a new package will have a different requirements set than a product that has a new design, but uses proven fabrication and packaging methods.

After the definition of the requirements, requirements remaining check 303 passes processing to requirement detail generation 304 if all of the requirements have not been processed. In requirement detail generation 304, a specification, i.e., the information in requirement database 120, is generated for ascertaining the scope of the requirement. The important aspect is that the specification provide a guideline for ascertaining all functions that must be performed to complete the requirement.

When requirement detail generation 304 for the requirement is complete, processing returns to requirements remaining 303 which either returns processing to requirement detail generation 304 if a requirement remains for specification processing, or transfers processing to stage remaining test 301. Upon processing transferring to stage remaining test 301, the process passes through definition 302, requirement remaining 303 and requirement detail generation 304, as described above, if any stages remain.

Figure 5:
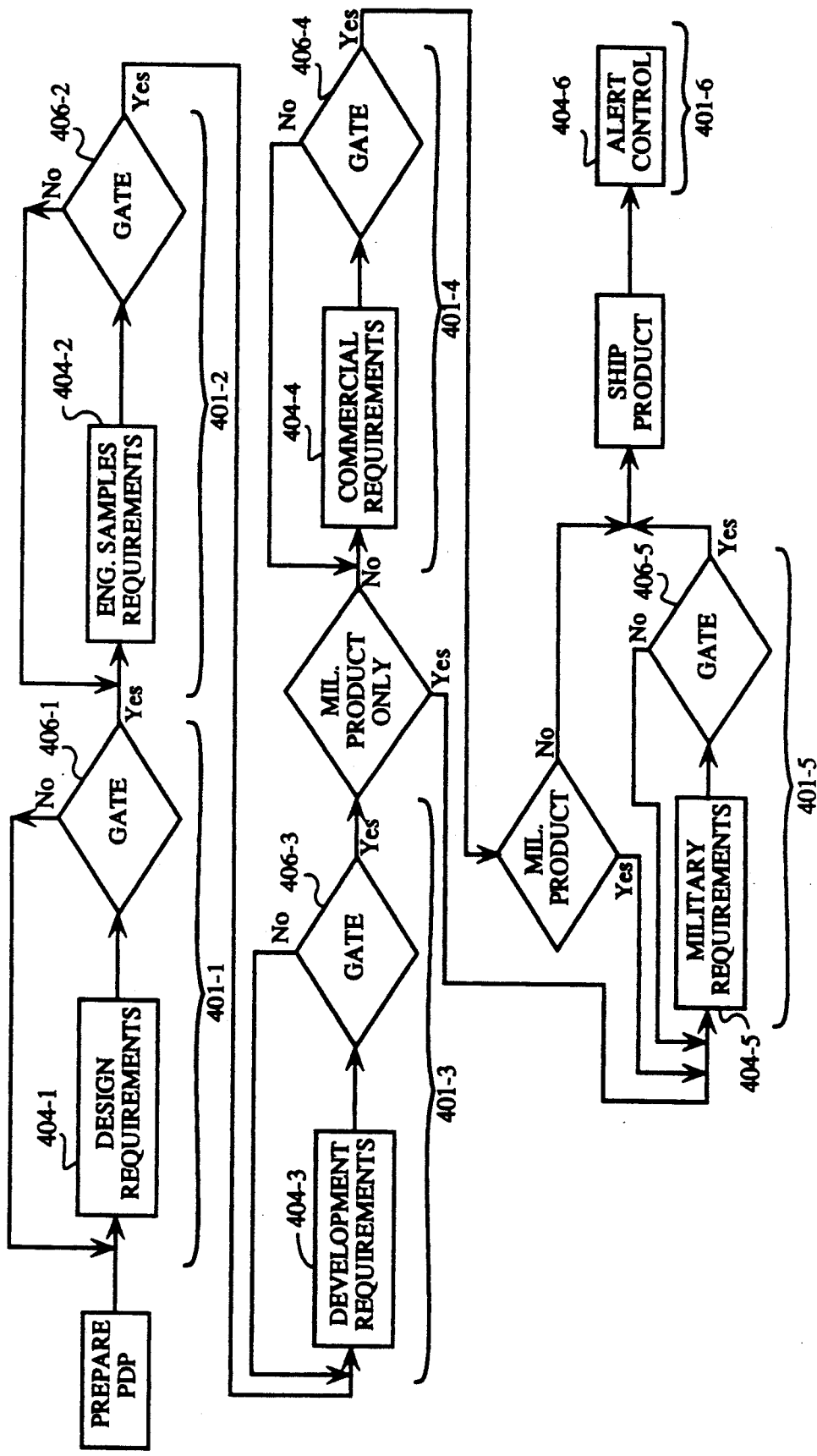
FIG. 5 illustrates the stages of FIG. 4 in more detail.

When all of the stages have been processed, stage remaining 301 passes control to generate product control matrix 305. Upon entry to generate product control matrix 305, the manufacturing process has been subdivided into a multiplicity of stages 401-1 through 401-6 (FIGS. 4 and 5) and each stage has been subdivided into requirements 404-n, where n equals 1, 2, ..., 6 (FIG. 5) The specification for each requirement has been completed. Thus, sufficient information is available to complete product control matrix 400 (FIGS. 7A, 7B and 7C).

Generation of product control matrix 400 depends upon the computer system and location of the facilities of the company. In one embodiment, product control matrix 305 is in a Digital computer system having a VAX operating system and a world wide-area network. The important aspect in generation of product control matrix 400 is that each person responsible for, or related to any portion of the product development have access to product control matrix 400 and the related databases.

Generation of the windows containing product control matrix 400 on the video display screen as well as text entry, access and manipulation associated with any procedures, data, or documentation are well-known to those skilled in the art and are not an essential feature of the invention. The important aspect is the operation and use of product control matrix 400 as a control center to assure that a fully operational quality product is shipped at the earliest possible date.

Historically, as described above, in the development of a new semiconductor product for example, a group, typically called a design group, worked in conjunction with marketing personnel to develop a design for the product. When the design was completed, the product development was transferred to an engineering group which fabricated samples and tested the product to validate the design. After the engineering tests were completed, the product was then transferred to manufacturing facilities which in combination generated the standard version of the product. At every stage of the manufacturing process there was the potential for inadequate interaction among various groups or agencies.

In contrast, according to the method of the present invention, all groups within a company that are responsible for any portion of the development of a product from the initial conception to the shipment of the standard versions of the product are involved throughout the product development cycle via the requirements defined by the product control matrix 400 (FIGS. 7A, 7B and 7C). (Herein, product control matrix 400 is one embodiment of the more general product control matrix 100 (FIG. 1)).

Figure 6:
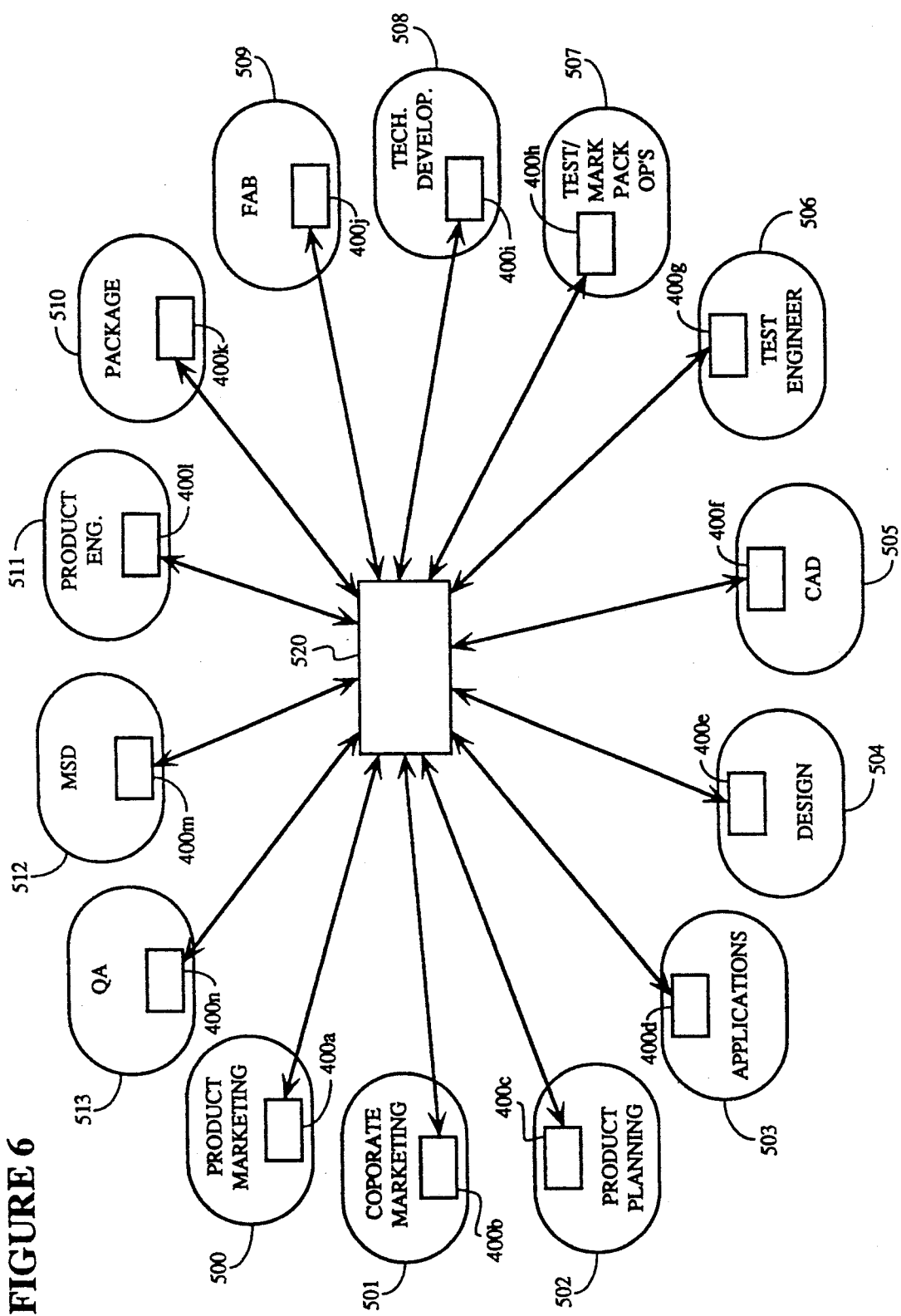
FIG. 6 schematically illustrates one embodiment of the computer system in which the product control matrix of this invention is based.

As illustrated in FIG. 6, the groups involved in new semiconductor product development may include, for example, product marketing 500, corporate marketing 501, product planning 502, applications 503, design 504, computer-aided-design (CAD) 505, test engineering 506, test mark pack operations 507, technology development 508, wafer fabrication 509, package development 510, product engineering 511, manufacturing services division (MSD) 512, and quality assurance (QA) 513.

The designation of the names of a particular group in the product development are illustrative only and are not intended to limit the invention to the specific groups described. In any manufacturing process, there are a number of groups within a company that are responsible for some aspect of the product development. According to the principles of this invention, each such group is integrated into the development process through product control matrix 400$t$, where t equals a, b, c, ..., n.

INITIATION OF THE PRODUCT DESIGN

The first step, in one embodiment, of product development is to prepare a product development plan (PDP). The product development plan describes the new product and the anticipated total market demand for the product over the estimated market lifetime of the product, e.g., the number of units of the product that will be sold by the entire industry each year until there is no longer a market for the product. Using the requirements sets of product control matrix 400, a time line is generated for each stage of product control matrix 400 and consequently, a reliable date for introduction of the new product to the market is forecast that comprehends the total engineering development of the product. Also, estimated are the number of units of the product that will be produced by the company after introduction and during the remaining market lifetime, sometimes referred to as the market window of the product. This estimated production and the total market demand is used to generate a profit estimate for the product over its market lifetime. The product development plan also usually includes performance requirements for the new product.

If the cost, time, market window and profitability projections of the product plan development comprehending the requirements of product control matrix 400 are approved by company management, work on the requirements sets of product control matrix 400 are initiated for the new product. Periodic review of the completed requirements in product control matrix 400 coupled with comparison of updated market projections and time estimates allows management to easily ascertain whether continued product development is economical or whether the product should be abandoned.

However, in contrast to the prior art methods of product development, after approval of the product development plan each of the various groups involved in bringing the new product to market have visibility on the total development requirements of product control matrix 400 and consequently there is informed interaction among the groups in the completion of the requirements. Therefore the requirements are completed expeditiously. The interactions are described more completely below.

Product control matrix 400 specifically defines the operations, and a stage of product development is not formally entered until all the operations in the previous stage are successfully completed and documented. Product control matrix 400 assures that when the subsequent stage is entered, all the information needed to proceed with the product development is available to each of the groups involved. Moreover, the information available either conforms with the standard operations or has previously been reviewed and approved by the appropriate groups.

Product control matrix 400 assures not only a smooth development process but also uniformity of development approach among all product lines. As used in the embodiment below, a product refers to a semiconductor device which includes one or more circuits, and which is typically contained in a single semiconductor package.

STAGE 1

One embodiment of product control matrix 400 for the six stages illustrated in FIG. 4 is presented in FIGS. 7A, 7B and 7C. This embodiment is the most complex because both a new product design, a new fabrication technology, and a new package design are all under development. Product control matrix 400 provides a novel means for expeditiously integrating all operations and functions associated with this complex development. In this embodiment, design stage 401-1 is divided into ten requirements, which are:
1) Process Qualification I;
2) Design Review;
3) Characterization I;
4) Test Plan;
5) Die Package Submission;
6) Packing Design;
7) Product Control Team;
8) Statistical Process Management I;
9) Product Performance Plan I; and
10) Product Qualification I.

Requirements 404-1 in design stage 401-1 not only completely document the requirements of the product design stage 401-1 but also assure initiation of all operations necessary for a smooth transition from design stage 401-1 through alert control stage 401-6. Each of requirements 404-1 in design stage 401-1 is explained more completely below. The requirements are described as they appear in product control matrix 400. However, the requirements are not listed in either sequential or chronological order within control matrix 400. To the extent possible, the requirements are performed in parallel, but obviously, as described below, some requirements within a stage must be completed before initiation of other requirements within this stage. One important aspect of requirements 404-1 is that upon successful completion of requirements 404-1, all the basic work has been completed for initiation of requirements 404-2 in engineering samples stage 401-2.

The first requirement in design stage 401-1 is process qualification I requirement 1. Process qualification I requirement 1 is the initial requirement that addresses the manufacturability and intrinsic reliability of the wafer fabrication technology that is used in the new product. To complete process qualification I requirement 1, the process technology development plan (TDP) is approved, and conceptual planning, preliminary topographical design rules (TDRS), and electrical design rules (EDRS) (including circuit simulation models) for the new process are completed according to the requirements described more completely below. The final function in process qualification I requirement 1 is to complete a semiconductor test chip to assure that the fabrication process meets specific requirements which are tailored to evaluate the intrinsic manufacturabilty and reliability of the process. In one embodiment, test structures monitoring at least the following process characteristics are provided:
i) gate dielectric integrity;
ii) inter metal dielectric integrity;
iii) charge induced shifts (ionic contamination, charge trapping);
iv) metal integrity (electromigration voids, step coverage); and
v) hot carrier injection.

The final function includes generation of updated TDRS and EDRS based upon the test chip performance. Preliminary reliability studies of the test chip are also performed and must be successful for satisfactory completion of the process qualification I requirement 1.

Device design review requirement 2 is the initial review of the new product design. Device design review requirement 2, in this embodiment, includes nine separate elements. While the nine elements are described more completely below, those skilled in the art, in view of this disclosure, can perform a device design review with any number of elements. The important aspect is that the initial design review cover the complete scope of elements required for a comprehensive definition of the design process. These elements are, in this embodiment:

1) Functional (Objective) Specification;
2) Product Design Methodology;
3) Simulations
4) Topographical Design Rule Check;
5) Maximum Current Density Locations;
6) Electrostatic Discharge (ESD) Protection Structures;
7) Test Vector Generation;
8) Fault Grading/Fault Coverage; and
9) Failure Analysis Tools.

The functional (objective) specification gives the functional parameters such as speed, switching times, voltages, and so forth, as well as the overall characteristics of the product. The functional (objective) specification is generated by the product planning/product marketing group. The functional specification is reviewed to insure that the specification is clear and understandable. Further, the specification is checked to assure that the product defined by the specification is, in fact, the product that the company intends to build. After review, the marketing manager, product planning manager, design engineering manager and product line manager approve the functional specification.

In product design methodology, the methodology and tools used to design the product are documented. The design path may consist of top level design, functional blocks, logic cells, as well as device/transistor level design. The design engineering manager and the product line manager review and approve the product design methodology.

In simulations, the operation and performance of the new product are simulated using available simulation tools, which are typically computerized. The simulations include the range of top level logic simulations through specific device level simulations. The latest version of the electrical design rules are used in the simulations. Further, the design engineering group optimizes the chip layout for chip/package interactions, such as pin capacitance, ground plane, and pad/bond wire interactions, using simulations, and documents the results of such simulations.

The product design review requirement is completed by running final simulations to check the behavior of the product at extreme conditions, and variances and margins are comprehended. The final product design simulation includes all AC/DC and functional parameters as given in the functional (objective) specification.

The final design simulation is thoroughly documented and includes the revision level of all the simulation programs and tools used. The final design simulation is completed prior to mask generation. The design engineering manager, the product engineering manager and the product line manager review and approve the simulations and the documentation and data generated by the simulations.

In the topographical design rules check, the product layout is checked against the topographical design rules to insure conformance with the rules. All violations/deviations of the topographical design rules are documented and approved by the technology, fabrication, and product line groups. Changes/updates in the topographical design rules may result from the topographical design rule check. All such changes are implemented in the topographical design rules and appear as a new revision of those rules. The technology groups are responsible for generating and updating the topographical design rules.

If "correct by design" tools (standard cells, previously qualified cells) are used for the layout, all supporting information is documented and approved by the technology, fabrication, and product line groups. The results of the topological design rule check are documented and retained in database 110 associated with product control matrix 400. The managers of design engineering, product engineering, the technology group, fabrication engineering, and the product line review the topological design rule documentation and approve the topological design rule check.

To establish maximum current density locations, the design engineering group identifies the appropriate locations and calculates the maximum current densities under worse case process/operating conditions. The technology group approves the maximum current densities before mask generation. The design engineering manager, product engineering manager, product line manager and technology manager review and approve the documentation that defines the locations with the maximum current densities under worse case process-/operating conditions.

To optimize ESD protection, the design engineering group uses the most robust ESD structure for the process technology/product combination to insure compliance with prevailing ESD requirements. The ESD structure behavior is either simulated to prove the structure's effectiveness or a correct by design justification is provided for the ESD structure.

In test vector generation, design engineering generates at least a minimum set of test vectors for the final simulation, described above in simulations, relevant to the functional (objective) product specification, also described above. Those test vectors are documented so that the test vectors are subsequently useful (i) in generation of test programs by the test engineering group, and (ii) in failure analysis of actual semiconductor chips later in subsequent stages of the product development. The managers of design engineering, product engineering, test engineering and product line each review and approve the test vector generation.

In fault grading/fault coverage, the design engineering group implements testability features in the product design. Using the test vector set defined in test vector generation, and the testability features defined by design engineering, a written estimate of the functional fault coverage for the new product is made. The goal of the fault grading/fault coverage element is to optimize test coverage of electrical performance. The managers of design engineering, product engineering, product line and test engineering must each approve the design of the testability features and the fault coverage.

The final element in device design review requirement 2 is failure analysis tools. This element is designed to expedite failure analysis on complex products. For example, if an electron beam microprober is to be used in the failute analysis such as the IDS-5000 E-BEAM microprober available from Schlumberger of San Jose, CA, the design engineering group generates a net list in a format acceptable to the microprober. The design engineering manager and the product line manager approve the input generated for the microprober.

Upon completion and approval of the nine elements in device design review requirement 2, device design review requirement 2 is marked as completed in product control matrix 400. The marking of this requirement complete means not only that the elements are completed, but also that the data supporting the elements are available for review, printing, or any other use supported by the computer system.

Upon completion of each of the requirements in product control matrix 400 and approval of the data and results of the requirement by the designated group or groups, the requirement is marked complete. Therefore, this action is incorporated by reference in each of the requirements described below and so is not included within the description of those requirements.

An important aspect of any product development is the operations that establish the functional quality and reliability characteristics of the product. In particular, the sensitivity of the functional, quality, and reliability characteristics of the new product to cumulative process variations in making the product must be understood. Characterization of the cumulative process variation is represented by characterization in the product control matrix and characterization requirements are included within each of the first five stages of product control matrix 400. The characterization requirements are paramount in establishing the manufacturability and profitability of the product.

By definition, the scope of the characterization requirement determines the scope of the acceptable process variation window. If the characterization requirement is performed using only nominal processing, the subsequent manufacturing will be similarly restricted. Thus, every effort is made in the characterization requirement to establish that the maximum variation range that will allow acceptable functional, parametric, quality and reliability performance.

In stage one, characterization I requirement 3 creates a plan for performing product characterization during the subsequent stages in the product development. This plan includes each of the process modules that are used to manufacture the product and that have been identified as affecting either the functional, quality, or the reliability characteristics of the product. For each such process module, the plan includes strategy to determine the maximum variation range of the process and the result of any interactions between process variations that in turn affects the functional quality and/or the reliability characteristics of the product.

In test plan requirement 4, the requirements are defined for a test strategy that is subsequently executed during later states. In this embodiment, test plan requirement 4 includes fault grading or fault coverage evaluation, test strategy and guard-banding scheme, external software and hardware support, test flow description, stress testing conditions, tester correlation, and manufacturing support for testing. Stress testing, as described more completely below, is addressed to insure shipment of a reliable product when the device/process technology requires such stress testing. Stress testing includes, but is not limited to burn in, high temperature operating life (HTOL) and voltage stress tests.

The fault grading or fault coverage evaluation of the test plan requirement is consistent with that described above in design review requirement 2 and as such is documented as a part of design review requirement 2.

The test strategy and guard-banding scheme of test plan requirement 4 encompasses the overall test philosophy of the product including any stress testing. In this function, a description of the test strategy is completed. This description includes:

1) Tester-type, and model No. or other specific identifying method for the tester, projected test times to allow for manufacturing to plan capacity requirements;

2) test coverage at all test steps (including, but not limited to, sort, class, post burn in, quality assurance,) and stress tests at all steps including, but not limited to, over-voltage, data retention bakes, and burn-in;

3) a description of the guard-banding philosophy used at all steps and plans to put the guard-bands in as early in the test flow as possible, and methods used for guard-banding AC and DC parameters, voltage, tester tolerance, shall be included;

4) a description of vector coverage for each of the functional areas of a device is provided;

5) a description of how the tests within the test strategy relate to the targeted quality and reliability levels; and 6) a plan for incorporating the requirements for the characterization test programs.

In the external software and hardware support of test plan requirement 4, introduction of any software and/or hardware needs associated with the product are documented. In the case of programmable products for example, programming algorithms and hardware needs are defined as well as a plan for vendor support of the programmable product, if required.

In test plan requirement 4, the test flow description describes the sequencing of the various tests within the test plan and allows evaluation against preferred standardized flows.

In the stress testing conditions of test plan requirement 4, stress test methods and conditions are selected that comprehend the dominant failure mode or modes consistent with the fabrication process technology selected for the product design. The reliability manager and the technology group manager, in one embodiment, approve the stress methodology.

If any form of stress testing is required to pass product qualification requirements 25, (FIG. 7a) 40, (FIG. 7b) 51, (FIG. 7b) 63, (FIG. 7c, see also STAGE 2 to STAGE 5 below) test the plan must include the burn-in circuit diagrams and board/driver/oven needs to support the stress test in the case of burn-in. Similar requirements apply to other stresses The appropriate burn-in circuit and conditions and/or other stresses are selected on the basis of ability to detect the predominant failure modes within the device/process technology.

In the tester correlation, the test program is correlated with the bench setup to insure that the test program/tester/setup is adequate to assure proper testing. Any additional tester types or setups used in the manufacturing process are also correlated against the bench setup or a previously correlated tester/setup.

The final element of test plan requirement 4 is the manufacturing support for testing. A plan detailing manufacturing test support is generated and updated as required. The plan includes:

1. Tester type and loading based on projected test times, number of insertions, setup time and similar information;
2. Burn-in and board requirements based on stress times needed to achieve the reliability goals and volume of product projected; and
3. Transfer intentions which include the intended final test site, the intended transfer date and the expected volume of product at that time.

The seven elements within the test plan requirement 4 are interrelated and require information and interaction of several groups. Thus, the product/test engineering manager, design manager and MSD engineering manager review and approve the data generated to support test plan requirement 4 prior to marking the test plan requirement complete in product control matrix 400.

In die package submission requirement 5, the product group requests the approval of a package by submitting a package qualification request. To obtain approval for a specific package, the product engineer submits a package request (device) package qualification request. In this embodiment, the die package approval is based on previous history of a specific package in relationship to die size and die geometry. The die package should conform with any design rules for the package and die.

If the die/package combination is not covered by the package and die design rules, the die/package requires formal qualification. The package approval request must have a bill of materials for producing the package with the product. Each of the items on the bill of materials must have passed a quality test. If any item does not have a completed qualification test, final approval for the die/package submission is given only after review of the qualification data for the items which were not previously qualified. Once the package request is approved by the packaging engineer, the packaging engineer is responsible for submitting a request to the mark, pack and test engineering director for package/handling equipment and materials.

The packing materials used for shipping the product from one location to another location are designed in the packing and orientation requirement 6. The packing material is selected so that the material prevents damage to the product during transit either within the company or from the company to the company's customer.

Product control team requirement 7 formally establishes the cross-functional team approach to product realization.

The team is selected to insure effective communication between the appropriate functions that are required to successfully complete the requirement and to provide control or traceability through the product life cycle. In this requirement, the key personnel are identified and committed to the product by signature. In one embodiment, the team includes the following responsibilities within the company:

| Product Marketing | Design | Product Engineering |
|---|---|---|
| Corporate Marketing | CAD | Division Quality |
| Product Planning | Test Engineering | Package Development |
| Applications | Test Mark-Pack | Technology |
| | Operators | Development |
| | | Wafer Fab Engineer |
| | | MSD Engineer |

Statistical process management I requirement 8 is used as a key tool in establishing the manufacturability, predictability, reliability, quality and cost of the product. In Stage 1, statistical process management I requirement 8 requires a preliminary listing of (i) all process modules and (ii) the associated equipment for all stages of the product manufacturing cycle from the incoming material assessment through the final quality assurance testing.

Product performance plan I requirement 9 identifies all key manufacturing indices of the product and the anticipated value of each of these indices as the product progresses through the stages in the product control matrix. The anticipated values of the key manufacturing indices are selected so that the indices are available for comparison with the product development plan estimates that were made initially.

The minimum operational indices include wafer yield, die yield, bin yield, assembly yield quality indices such as visual/mechanical (V/M), hermeticity, electrical, quality and reliability indices (early failure rate/extended life (EFR/EL)). If a burn-in screening requirement is incorporated in any part of the product development or production cycle, this requirement must be indicated on the performance plan together with the anticipated post-burn-in yield.

The final requirement in Stage 1 is assembly and package qualification 10. The purpose of assembly and package qualification requirement 10 is to assure the manufacturability and intrinsic reliability of the assembly and packaging process. Therefore, this requirement produces a formal plan to establish the intrinsic reliability of the assembly/packaging process through stress testing of test die/package combinations, where the test die have been specifically designed to evaluate the thermal, mechanical and hermetic robustness of the die/package combination.

Upon completion of the ten requirements in design stage 401-1, gating function 406-1, which is performed by the QA manager and the product manager, requires evaluation of all results and documentation for design stage 401-1. If the documentation and results as represented in database 110 associated with product control matrix 400 are satisfactory, the gate is opened.

In evaluating the results, a rigid requirement for exact compliance with every requirement is not used. Rather, the results are analyzed to ascertain whether the intent of the requirement has been met and whether any deviations from the specified requirement are documented and an appropriate explanation provided so that any effect on quality or reliability of the product may be ascertained.

Opening the gate means that the product is clearly identified with a coding of "DS" (design stage) in the company's manufacturing management systems. Typically, after completion of a stage, the product is marked externally with a symbol appropriate to that stage, and the revenue and warranty associated with products so marked are specified. Since after Stage 1 the product is still in internal development, there are no revenue, warranty, or mark associated with the product. However, as shown in product control matrix 400, these are cumulatively indicated as first mask set meaning that upon successful completion of design stage 401-1, the funding and authorization to proceed with a first mask set for the new product is available.

If there are any unacceptable inconsistencies, errors, incomplete analysis/results, or other problems in the first stage, gate 406-1 is not opened. Any problems, which are encountered, must be corrected and/or clarified prior to opening of the gate and generation of the first mask set.

STAGE 2

The second stage in product control matrix 400 is engineering sample stage 401-2. In the engineering sample stage 401-2, the initial mask set and engineering samples of the product are made and evaluated. This stage includes eighteen requirements which are:
11) Process Qualification II;
12) Mask Index Issued;
13) Mask Set Fabrication Accepted;
14) Design Verification;
15) Design Resimulation;
16) Characterization II;
17) Test Flow Document;
18) Assembly Process Document;
19) Package Outline;
20) Manufacturing Logistics Plan;
21) Records Plan;
22) Statistical Process Management II;
23) Product Performance II;
24) Package Qualification II;
25) Product Qualification I;
26) Reliability Monitor I;
27) RFB Approved; and
28) Advance Data Sheet.

In the first stage the complete process flow, including all process flow modules, was identified. In process qualification II requirement 11, the manufacturability and intrinsic reliability of the wafer fabrication is further developed. The factor $C_p$ is a standard known means for characterizing process modules. $C_p$ for all critical process modules is determined using fully diagnostic test chip or a representative product vehicle, referred to as a technology product vehicle. Here as previously described, a critical process module is a module in which the process variations affect the manufacturability, reliability and/or quality of the product. The mask index template generated by the technology group is approved by the fabrication group and the fabrication group approves limited production startup of the engineering samples.

In mask index issued requirement 12, the requirements for the product mask set are specified and documented. The product/design manager is typically responsible for generation of the mask index and upon completion of the requirement, the design engineering manager and the product line manager approve the mask index.

Mask set fab acceptance requirement 13 is coupled with mask index issued requirement 12. The mask set referenced in mask index issued requirement 12 is approved by the wafer fab engineering manager for use in engineering samples production runs and an approved mask index specification is issued for fabrication use. The product manager typically issues the mask index specification and the mask index fabrication is approved by the fabrication management.

In design verification requirement 14 of this stage, the previously verified test vectors are run on the engineering sample device with the specified timing, voltage and current levels to verify the functionality of the engineering sample device. Alternatively, if approved by design management, an alternative bench test may be used. A table of results is generated which lists the parameters and the measurements of that parameter, timing, etc., alongside either the goals from the product development plan or information from the advanced data sheet, which is described more completely below.

In design resimulation requirement 15, design engineering reviews the data from design verification requirement 14 in comparison with the design objectives of requirement 2. If the actual performance of the engineering sample product is inconsistent with the simulation results from requirement 2, resimulations using updated models based upon the observed performance of the engineering sample products are made. If warranted, the simulation models/tools are updated to represent a more realistic performance model. If a decision is made not to perform design resimulation requirement 15, a technical justification is provided for the decision. The design engineer and product line managers review the resimulation results and/or technical justification for not performing a design resimulation.

In characterization II requirement 16, the first mask set performance is evaluated using an engineering sample product. The scope of the mask set performance evaluation includes both a nominal process and statistically designed experiment (SDE) matrix process runs. The advance data sheet, described more completely below, is used as a performance reference for this evaluation. Diagnostic device analysis is also completed in this requirement. The results of the first mask set performance evaluation and the device analyses are documented in a report. Subject to the results, a mask improvement plan is also provided.

In design stage 401-1, test plan requirement 4 generated a test flow description. In this stage, test flow specification requirement 17 results in the generation of the test flow specification for the test flow description generated in first stage 401-1. Generation of the test flow specification, in one embodiment, consists of selecting one test flow that includes the features in the test flow description from a document containing a compilation of acceptable standard test flows. Burn-in and test conditions are provided in the compilation of acceptable test flows. With the selected test flow, the product line specification writer may generate either an automated process specification using a computer based means for generating the test flow specification or alternatively any other means which converts the burn in and test conditions into a test flow specification. Nonstandard flows, i.e. flows which are not provided in the compilation, for assembly and/or test, mark and pack are separately approved by a Vice President of the manufacturing service division. The nonstandard flow is documented in a specification in the same manner as the standard flow.

In assembly process specification requirement 18, the assembly process steps are added, as required, to the corporate listing of approved assembly flows and a detail flow chart generated to document the specific package type. All critical assembly processes and inspection/tests are listed in the baseline policy. In this embodiment, the assembly process includes any process step after wafer sort electrical test through to final assembly visual inspection, prior to electrical class test.

The outline drawing with all the dimensions needed by the customer to assemble the product in boards using automated equipment is generated in catalog package outlines and dimensions requirement 19. The packaging engineer ensures complete documentation of all piece parts needed for the package.

In manufacturing logistics plan requirement 20, a manufacturing logistics plan is generated that identifies the wafer fabrication location, assembly plant/subcontractor location, test location, test equipment and mark/pack location. The manufacturing logistics plan also includes a preliminary bill of materials needed for each of the various locations, and an estimated quantity of product to manufactured on a monthly basis during the engineering, development and standard product stages. The manufacturing logistics plan estimates the fabrication, test, and assembly production volumes required to be consistent with the PDP targeted ramp up for the product.

In records plan requirement 21, all detailed materials relevant to the product development history are maintained in a secure location and made readily accessible. The product group provides a record plan that lists all key records, material, and indicates, for each item, the intended retention method. The records plan is specific enough and comprehensive enough to allow ready access to all the key engineering information so that product reliability can be maintained even in the absence of any or all of the product control team. These records include engineering detail, for example, a complete design data base, and for some of the requirements these records are significantly more detailed and voluminous than summaries supplied to meet the requirements.

Statistical process management II requirement 22 requires an updated (requirement 8) listing of the process modules and specific equipment used in producing engineering samples. SPC (statistical process control) parameters, sampling plans, and charting methods are identified for each process module. Statistical equipment control (SEC) parameters, sampling plans and SPC methods are identified for process equipment and metrology equipment. Statistical capabilities studies are established for each piece of process equipment and each piece of metrology equipment.

In product performance II requirement 23, a formal report of operational indices on the latest production units and a tabulation against the anticipated results projected in product performance requirement 9 and the PDP is generated. Deviations from the projections are highlighted together with a corrective action plan or other engineering/management rationale. In this stage, an updated listing of the predicted indices for each of the subsequent stages is also generated.

In assembly and package qualification II requirement 24, the manufacturability and intrinsic early failure rate ("EFR") reliability of the assembly and packaging for the new product are further demonstrated using test die/package combinations in accordance with requirement 10. In one embodiment, this demonstration requires that the assembly and packaging be shown to be cost effective, standardized, feasible of volume manufacturing, and that the intrinsic EFR reliability meets or exceeds the standard requirements associated with assembly and packaging in the industry.

A formal plan to assess the reliability of the actual product is prepared in product qualification I requirement 25. In this requirement, a formal plan is generated to establish the reliability of the product, including the range and duration of stress tests, sample size, and acceptance/rejection criteria for the product.

A formal plan to monitor product reliability is prepared in reliability monitoring I requirement 26. In this requirement, assignment of the product to a representative grouping for reliability test purposes, including possibly the creation of a new grouping is done. The planned range of tests and frequencies, logistics to support reliability monitoring requirements in the subsequent stages and an anticipated start date for the reliability monitoring requirements in the subsequent stages are also established in this requirement.

In request for build requirement 27, the initial request for the assembly of engineering samples is completed. This request includes a system for tracking the request for build engineering lots through the manufacturing and testing system. In addition, specifications are provided that define product line responsibility as well as MSD engineering. The purpose of the request for build ("RFB") system is to provide highly expedited and possibly non-standard assembly/test of the engineering sample product.

Advance data sheet requirement 28, a partial, targetted, functional and parametric performance for the eventual standard (military and/or commercial) versions of the product, comprehending the data arising from product produced to date is defined. The advance data sheet provides an initial marketing device allowing customer consideration of the targetted specification.

After the requirements in engineering sample stage 401-2 are completed and documented, the gate manager 406-2 reviews the results and the documentation. If the results and documentation are satisfactory, gate 406-2 is marked open and the designation for the products made after this time is "ES" and the product is shipped and marked with the same designation. Since the samples are still in this early development stage, no revenue is received and consequently no warranty is extended for the engineering samples, unless there is a written customer contract, acknowledging the product status and agreeing to specific payment and/or warranty conditions.

If either the documentation or results are unsatisfactory, they are reworked as necessary. Again the important aspect is that the requirements in this stage must be successfully completed to assure an expeditious and successful early introduction of the standard product to market.

STAGE 3

Upon completion of engineering sample stage 401-2, the third stage, development stage 401-3, is formally entered. In this embodiment, development stage 401-3, has fifteen requirements, which are:
29) Process Qualification III;
30) Characterization III;
31) Test Programs Released;
32) Quality Assurance Testing Started;
33) Build Sheet Released;
34) Packing Defined;
35) Visual/Mechanical Requirements Definition;
36) Marking Requirements Definition;
37) Statistical Process Management III;
38) Products Performance III;
39) Package Qualification III;
40) Product Qualification II;
41) Reliability Monitor II;
42) "DV" Processing Specification;
43) Preliminary Data Sheet;

As in the previous process qualification requirements, process qualification III requirement 29 further documents the manufacturability and intrinsic reliability of the wafer fabrication technology. In this requirement, the test chip or technology product vehicle demonstrates the intrinsic reliability of the process technology to both the prevailing EFR and extended life requirements. Additionally, the process technology is approved by the fabrication group for a full production release. If process qualification III requirement 29 is only met by burn-in or other stress screening, the required stress screening is defined in detail. Where stress screening is required, the process technology is only released subject to formal approval of the Vice Presidents of technology, wafer fabrication and quality.

In characterization III requirement 30, the intended DV mask set performance is evaluated. The scope of the evaluations includes both a nominal process run and SDE matrix process runs. The performance reference for the evaluation is the preliminary data sheet and diagnostic device analysis is again completed. A characterization report is issued with a mask improvement plan if needed.

In test program release requirement 31, electrical test programs consistent with the preliminary data sheet for the product are defined and released to manufacture. The test programs may be released via the corporate document control system, and must conform to the corporate test program control policy.

In quality assurance testing requirement 32, the divisional quality group verifies that the tests for visual, mechanical and electrical have started for the product. Sample sizes and the acceptance criteria will be consistent with the corporate quality assurance policy. The quality monitoring program results are recorded continuously in a quality data base and provide verification that the quality monitoring program has started and is on-going.

In build sheet release requirement 33, the build sheet, which is a bonding diagram that explains to the operator the correct die placement in the package and the interconnecting lead wire placement between the die and the package, is released. This document also defines the types of materials used to assemble the product. The build sheet is released only when the configuration has been assigned in the corporate manufacturing management system and the bill of materials for the assembly and packaging is complete.

The packing and orientation standard final release requirement 34 assures that devices packed in the manner defined in the specification have undergone national transit type of testing and that these devices have passed electrical, visual/mechanical and hermeticity testing. For surface mount devices, which are susceptible to moisture degradation, the devices are subjected to the environmental life test conditions of the reliability monitor program ("RMP") (requirement 52 below) as well as destructive analysis.

In requirement 35, a document is generated that defines the workmanship standards for the visual and mechanical characteristics of each package and the lead finish. Prior to the release of the new package, the document is updated so that the criteria satisfy not only the company standards but also all customer requirements.

The quality standard for marking of devices is defined in requirement 36. Based on the marking code convention used and the package outline, the mark orientation is defined in the specification. Also, the marking, as defined, conforms to any standards for type-size, based on package outline.

Statistical process management III requirement 37 requires a specific list of the process modules and associated equipment used in producing the latest development sample product. Process and equipment capabilities are established by statistical means. SPC and SDE are established on a per process module basis. A formal regular SPC report system is established. A written plan to optimize each process module, e.g., center mean values of the process and reduce the variation, is also completed.

In product performance III requirement 38, a formal report of the latest operational indices is generated. The indices for the development product are compared with the predicted results from the second stage, or the PDP, and an updated prediction for the next stage is made. Deviations are highlighted together with a corrective action plan or other engineering/management rationale for the deviation.

In package qualification III requirement 39, manufacturability and intrinsic reliability of assembly and packaging are fully proven using representative test die/package combinations.

In product qualification II requirement 40, the reliability of the specific die/package combination is proven to meet or exceed the prevailing early failure rate (EFR) requirements.

In reliability monitor II requirement 41, the EFR of each lot of DV product is monitored either by 100% burn in or a statistically meaningful sample plan approved by the quality group. Only products which are consistent with the EFR standards are shipped. Additionally, the extended life performance of the DV product is regularly monitored in a program which meets or exceeds the requirements of the corporate reliability monitor program (requirement 52 below)

In processing specification requirement 42, the manufacturing floor is provided with the flow for all test, mark, and pack operations and the specific specifications that apply to each step in the flow. On completion of the requirements for this stage, the part is marked with the standard mark, plus the letters "DV" and when the products have successfully completed the requirements for the next stage, the processing specification must be changed to eliminate the "DV" letters.

In Preliminary Data Sheet requirement 43, the targeted functional and parametric performance of the standard versions of the product comprehending the total data from product produced to date, is defined. The Preliminary Data Sheet is specific and comprehensive, but clearly indicates that the targeted, functional, and parametric performance is still subject to change at this time.

On completion of the fifteen requirements of development product stage 401-3, the gating operation 406-3 for that stage evaluates the results and documentation. Again, if the documentation and results, as represented in database 110 associated with the product control matrix 400, are satisfactory, gate 406-3 is opened. Opening the gate means that the product is classified "DV" to indicate that the product has completed the development product stage 401-3 and may be shipped to a customer. The products made after this time are also marked "DV" and revenue is accepted for the parts and a standard warranty is given.

STAGE 4

At this point in the product development, the first three stages have been completed and so final actions to establish standard production of the new product are ready to begin. Unlike prior art methods where at this point in time the manufacturing facility would potentially be contacted for the first time to start the production runs, product control matrix 400 has assured that all the groups involved in the manufacture of the new product have been integrated into the product development process and the requirements for the standard production have been defined and built into the product development.

In one embodiment, standard production may consist of either a commercial product which is produced through the standard commercial product stage 401-4 or alternatively a military product which is developed through military product stage 401-5. These stages are similar except that the military product typically has additional and different operating condition requirements, and these requirements require additional testing and/or verification.

Standard commercial product stage 401-4 includes eleven requirements. The requirements are:
44) Test Programs Class 11;
45) Characterization IV;
46) Test Programs Revision Control;
47) Engineering Change Notice Established;
48) Passport/Specification Audit;
49) Statistical Process Management IV;
50) Product Performance IV;
51) Product Quality III;
52) Reliability Monitor III;
53) Processing Specification; and
54) Final Data Sheet.

Upon completion of the requirements in standard commercial product stage 401-4, the new product is ready for volume introduction to the standard product market.

In test programs class 11 requirement 44, all test programs, including wafer sort are documented in accordance with corporate policy which requires definition of actual parametric values used in testing data sheet listed parameters.

In characterization IV requirement 45, the intended "PR" mask set performance is evaluated. The scope of the evaluation includes a statistically defined number of both nominal process and SDE matrix process runs. The performance reference for the evaluation is the intended final data sheet. Again, device analysis is completed and a characterization report is issued demonstrating acceptable yield and parametric stability or a minor mask improvement plan, based upon assignable causes identified by device analysis and yield analysis.

In test program revision control requirement 46, all test programs, as previously defined, are placed under revision control via the corporate manufacturing management system.

In engineering change notice (ECN) requirement 47, an engineering change notice procedure is established that applies to the product baseline defined by the combination of statistical process management (SPM) IV requirement 49, product performance IV requirement 50, and product passport requirement 48, described below, for those lots submitted for product qualification III requirement 51. With reference to the SPM IV requirement 49 and product performance IV requirement 50, the definition of change applicable to $C_p$'s, variable distributions, yield, etc. is that statistical definition given in SPM 4 (requirement 49 below).

In passport and specification audit requirement 48, all of the data demonstrating compliance with the requirements of product control matrix 400 are compiled from the computer system in a hard copy document by product line and supplied to the divisional quality group. Engineering change notices apply to product passport information as defined in ECN requirement 47 above. The product group has the responsibility to ensure that the product passport is continually maintained to represent current processing. All of the product passport data or a subset thereof may be supplied to customers at the product group's discretion subject to prevailing company rules governing proprietary or confidential information. Prior to final approval of the product passport, the product line ensures consistency between all referenced specifications and revisions.

In statistical process management IV requirement 49, the specific process modules and associated equipment used in manufacturing the latest "DV" lots prior to the "PR" transition are listed. The results of SDE are applied to provide improved process control. Current $C_p$'s are listed for each process module. Target $C_p$'s of 2 apply to each module. $C_p$'s less than 1.3 require a specific $C_p$ improvement plan.

In product performance IV requirement 50, a formal report on the operational indices for the latest production product sample are generated. This report is a comparison with the anticipated results that were projected in the third stage and in particular, a comparison with the predictions of the PDP. Significant deviations from the PDP target are highlighted together with corrective action plans or other engineering/management rationale for the deviations. Release of the product to standard production status is contingent on the joint quality/product manager approval of any required planning to improve operational indices.

In product qualification III requirement 51, the reliability of the specific die/package, combination is proven to meet or exceed the EFR and the extended life requirement of the prevailing corporate reliability qualification policy. If the process technology has been qualified as intrinsically capable of meeting the standard without burn-in or stress screening, the product is not released to standard production with burn-in or other stress screening unless a viable corrective action plan for the product based upon assignable cause specifically identified by failure analysis is provided. The plan will be specific on maximum duration of production requiring burn-in or other stress screening and is jointly approved by division quality and the product manager.

If the process technology has been released for production subject to burn-in or stress screening, the product may be released to production if the required screening to achieve the EFR/extended life standards is less than or equal to that specified for the process technology.

In reliability monitor III requirement 52, a program is put in place to monitor the total reliability of the standard production in accordance with the prevailing corporate reliability monitor program.

In processing specification requirement 53, all test mark and pack operations for the product are defined in the form of a standard computer generated flow document which requires the product to be marked with a standard mark.

In Final Data Sheet requirement 54, the warranted functional and parametric performance of the standard versions of the product, comprehending the total data available to date, is produced. The Final Data Sheet is specific and comprehensive and defines the contractual definition of product performance.

After the eleven requirements in standard commercial product stage 401-4 are completed, the results and documentation for the stage are reviewed at the gating operation 406-4. If the documentation and results are approved, gate 406-4 is opened and the designation for the standard product is "PR". The product is marked with the standard mark, with no additional marks, to indicate that the product is a standard product and revenue is received and a standard warranty is given. If any problems are detected in the results and/or documentation the approval to ship as standard is withheld until such time as the requirements are satisfied so that a quality product may be shipped to the customers.

STAGE 5

Military product stage 401-5 includes twelve requirements which are:
55) Test Programs Class 11 (MIL);
56) Characterization V;
57) Test Programs Revision Control (MIL);
58) APL/CPL Approved;
59) Engineering Change Notice (MIL);
60) Passport (MIL);
61) Statistical Process Management V;
62) Product Performance V (MIL);
63) Product Quality IV;
64) Reliability Monitor IV;
65) Processing Specification (Military); and
66) Military Data Sheet.

In test programs class 11 (MIL) requirement 55, all test programs for military product versions are documented as described above for test programs class 11 requirement 44.

In characterization V requirement 56, the standard/military mask set performance is evaluated. Where the product development plan was predicated on military production from the standard mask set, the standard mask set performance is evaluated to military data sheet performance limits. Otherwise, a separate military mask set performance is evaluated. Characterization V requirement 56 performs the same functions as described above in characterization IV requirement 45 for the military product's temperature range.

Test programs revision control (MIL) requirement 57, passport and specification audit (MIL) requirement 60, statistical process management V requirement 61, product performance V requirement 62, and reliability monitor IV requirement 64 are equivalent to the corresponding requirements in the fourth stage 401-4, except the standard product is replaced with the military product in the requirements for this stage.

APL/CPL Approval requirement 58, designates the level of compliance of the product to the prevailing national standards. The evaluation of compliance is made by reviewing the 11.XXXX series documents (requirement 44 above), and additional document 10.XXXX which describes aspects of the product relevant to military requirements. The evaluation is conducted by a specialist department of the corporation, the Military Program Office. The product is listed on either the approved product list (APL) or the controlled product list (CPL) as required.

In engineering change notice (MIL) requirement 59 the military versions are subject to the engineering change notice requirements of requirement 47 above.

In product qualification IV requirement 63, the product qualification III requirement 51 is performed for all military versions with the exception that the product may be released to product qualification IV if the required military screening results in shippable product meeting or exceeding the prevailing corporate reliability qualification standards.

In processing specification (MIL) requirement 65, the specific requirements for test, mark and pack of the military version of the product are defined. Specifically the specification generated in this requirement provides the manufacturing floor with specific specifications that apply to each step in the flow. This specification is equivalent to that described previously for the standard commercial product except that the processing spec provides for military temperature testing and military marking.

In Final Data Sheet (MIL) requirement 66, the warranted functional and parametric performance of the military versions of the product, comprehending the total data available to date on military versions is produced.

STAGE 6

The first five stages in product control matrix are used to provide an integrated management center for achieving the earliest date to market of a reliable, functional, and fully qualified new product. However, this does not complete the life cycle of the product. As indicated in the product development plan, discussed above, the product will continue to be produced for some time after the introduction to the market. Accordingly, stage six 401-6 of product control matrix 400 is designed to monitor any problems that may arise with product performance, predictability of manufacture, reliability, and quality, during the product lifetime. In stage six, four requirements are monitored; they are:
67) Reliability monitor program failure;
68) Field failure;
69) Out of Control SPC; and
70) Baseline(passport) changes.

These requirements are designed to provide an immediate response to any data which indicates the company or customer is having problems in terms of continued manufacturability, quality, or reliability. Within the company, appropriate changes in control level 401-6 are separately highlighted in the engineering change notice system and require immediate notification of the product and quality managers.

Externally generated data triggering the alert system 401-6 are field failures of the product. On receipt of any alert notice issued under Stage six, product management and quality groups jointly define a situation management plan which may include an immediate stop of production, a stop of shipment, or simply customer notification.

In addition to the alert control the passport set may also be used as a basis for a product change control system. Control of predictable manufacturing, quality and cost throughout the production life of the product is provided by a combination of the statistical process management IV requirement 49, statistical product management requirement V, military 61, product performance plans IV and V, 50, 62 and the engineering change notice system, 47, 59.

When a change in the level of statistical process management or other performance measure is provided to product management or division quality, a joint decision is made on which aspects of the product control requirements, if any, must be repeated to maintain the status of a product. When applicable, the requirements set of the product control matrix or a subset of the requirements set may be used. The detail of the requirements set from the product control matrix or the subset for each engineering change notice is at the discretion of the division quality manager and the product manager acting in concert.

The above description to the requirements in product control matrix 400 are illustrative of one embodiment and are not intended to limit the invention to the specific requirement disclosed. The important aspect of the invention is that product control matrix 400 and the two databases 110, 120 associated with product control matrix 400 are used to provide an integrated means within a company to produce in a predictable fashion a quality, reliable and fully functional product at the earliest possible date and to maintain those characteristics throughout the product lifetime.

The above product control matrix defines the worst case set of requirements where every aspect of the new product is unproven, i.e. a new fabrication process, a new package and a new product design. However, frequently one or more of these aspects are known. Therefore, other requirements sets, which are subsets of the case described above, are used in such situations.

Each of the cases are described below and the modified product control matrix used for each case is shown in FIGS. 8a through 15c.

The requirement set described above for a new technology, new package and new product assumes that the new technology is being developed concurrent with the new product. This is a the high risk case where the PDP assumptions and the progress of the new technology must be continuously reviewed in parallel with engineering work on the new product. The requirements for technology development are defined in the three stages, as discussed above, coincident with the first three stages of product release. In common with all other requirements, the technology development stages must be satisfactorily completed before the product status can change. When the technology progress is lagging, the associated product development may proceed, subject to a review and sign off by division quality, technology, wafer fabrication and the product line.

Thus, the nine cases which use product control matrix 400 are:
Case 1 (FIGS. 7a–7c)—new technology, new package, new product.
Case 2 (FIGS. 8a–8c)—qualified technology, new package and new die.
Case 3 (FIGS. 9a–9c)—new technology, qualified package and new die.
Case 4 (FIGS. 10a–10c)—new technology, new package and qualified die.
Case 5 (FIGS. 11a–11c)—qualified technology, qualified package, new die.
Case 6 (FIGS. 12a–12c)—qualified technology, new package, qualified die.
Case 7 (FIGS. 13a–13c)—new technology, qualified package, qualified die.
Case 8 (FIGS. 14a–14c)—qualified technology, qualified package, qualified die, new combinations of the technology, package, and die.
Case 9 (FIGS. 15a–15c)—qualified technology, qualified package, new die (die design is a variant on a subset of standard cells already fully qualified in the technology package combination.)

The product control matrix for each of the above cases is identical to that described above except the requirements for the qualified elements are eliminated from the matrix. In FIGS. 8a through 15c, the fields following the requirement numbers which have been eliminated are blank.

I claim:
1. A method of monitoring product development comprising:
   providing a plurality of product development stages for said product development wherein said product development stages are capable of being displayed on a display unit of a computer system;
   providing for each of said product development stages, a set of requirements with each requirement having a unique identifier;
   wherein the set of requirements defines the product development operations in the product development stage including engineering functions necessary for successful completion of subsequent product development stages and sequencing of engineering functions to ensure a selected time to market for said product; and
   the identifier for each requirement in the set of requirements is capable of being displayed within the product development stage on said display unit;

providing for each requirement a means for determining the completion status of that requirement; and indicating the completion of each requirement as each requirement is completed so that the status of the product development is indicated by the number of requirements capable of being shown as complete on said display unit.

2. The method of claim 1 further comprising:

describing each requirement within said computer system wherein in response to a user (i) selecting a requirement on said display unit and (ii) providing a predetermined input command from a data input means, the description for the selected requirement is displayed on the display unit.

3. The method of claim 1 further comprising:

providing, for each of said product development stages, gate means having an open and a closed state, wherein said gate means is opened only when all of the requirements for the product development stage have been successfully completed so that the subsequent product development stage may be entered.

4. The method of claim 1 further comprising:

storing the results and data for each requirement in said computer system so that in response to a user (i) selecting a requirement on said display unit and (ii) providing a predetermined input command from a data input means, the data for the selected requirement are displayed on the display unit.

5. The method of claim 4 further comprising;

generating a passport for said product upon completion of all the requirements in product development stages prior to introduction of the product to market wherein said passport contains the results for all or selected requirements in product development stages prior to introduction of the product to market.

6. A system for monitoring product development comprising:

means for indicating at least one product development stage to depict the status of the development of a product;

means for providing for said at least one product development stage a set of requirements wherein the set of requirements defines the product development operations in the product development stage including engineering functions necessary for successful completion of any subsequent product development stages and sequencing of engineering functions to ensure a selected time to market for said product; and means for associating with each requirement an indicium of the status of that requirement.

7. The system as in claim 6 including means for indicating the specific details of each requirement associated with each product development stage in said system.

8. The system as in claim 7 including means for indicating the particular data generated to satisfy each requirement indicated as completed in said system to allow a determination to be made as to whether such data is actually sufficient to satisfy such requirement.

9. The system as in claim 8 including means for printing selected data with respect to the product to create a record of the characteristics of the product.

10. In a computer system having a display unit and a means for data input, a method of controlling product development comprising:

displaying a plurality of product development stages for said product development on a display unit of said computer system;

displaying within each of said product development stages a set of requirements with each requirement having a unique identifier wherein the set of requirements defines the product development operations in the stage; and the set of requirements in each product development stage includes engineering functions necessary for successful completion of subsequent product development stages and sequencing of engineering functions to ensure a selected time to market for said product so that resources are used in an effective and economical manner;

displaying for each requirement a completion status of that requirement so that the status of the product development is indicated by the number of requirements shown as complete on said display unit thereby providing a visible record of the status of the product development; and indicating that a requirement is complete upon recording data and results for said requirement in a database in said computer system wherein in response to a user (i) selecting a requirement on said display unit and (ii) providing a predetermined input command from said data input means, the data for the selected requirement are displayed on the display unit.

11. The method of claim 10 further comprising:

storing within said computer system a description of each requirement wherein in response to a user (i) selecting a requirement on said display unit and (ii) providing a predetermined input command from a data input means, the description for the selected requirement is displayed on the display unit.

12. The method of claim 10 further comprising:

providing, for each of said product development stages, gate means having an open and a closed state, wherein said gate means is opened only when all of the requirements for the product development stage have been successfully completed and documented in said database.

13. The method of claim 10 further comprising:

generating a printed report upon completion of all the requirements in product development stages prior to introduction of the product to market wherein said printed report contains the results for all or selected requirements in product development stages prior to introduction of the product to market.

14. A computer-based method for quality control during product development comprising the steps of:

using a product control matrix, displayed on a display unit of a computer system, for monitoring product development wherein said product control matrix includes a plurality of product development stages and each product development stage includes a plurality of requirements wherein the plurality of requirements define the product development operations in the product development stage including engineering functions necessary for successful completion of subsequent product development stages and sequencing of engineering functions to ensure a selected time to market for said product;

each product development stage includes a gate having an open and a closed state, wherein said gate is opened only when all of the requirements for the product development stage has been successfully completed;

using a first database to provide a description of operations in each of said requirements wherein upon inquiry, said description of operations for a selected requirement are displayed on said display unit; and using a second database to record data and results as each requirement is completed wherein upon inquiry, results and data for a selected requirement are displayed on said display unit and further wherein comparison of the description of operations in said first database for the requirements in one product development stage with the results and data in the second data base for the requirements in said one product development stage are used to determine when to open the gate in said one product development stage.

15. The computer-based method for quality control during product development of claim 14 further comprising the step of generating a printed report upon completion of all the requirements in product development stages prior to introduction of the product to market wherein said printed report contains the results for all or selected requirements in product development stages prior to introduction of the product to market.

16. The computer-based method for quality control during product development of claim 14 wherein said plurality of product development stages include a design stage, an engineering samples stage, a development product stage, and a product stage.

17. The computer-based method for quality control during product development of claim 16 wherein said design stage includes a test plan requirement.

18. The computer-based method for quality control during product development of claim 16 wherein said design stage includes a packing design requirement.

19. The computer-based method for quality control during product development of claim 16 wherein said design stage includes a process qualification, package qualification, a product performance plan and characterization requirements.

20. The computer-based method for quality control during product development of claim 16 wherein said development product stage includes process qualification, package qualification, a product performance plan and characterization requirements.

21. The computer-based method for quality control during product development of claim 16 wherein said engineering samples stage includes a manufacturing logistics plan requirement for volume production.

22. The computer-based method for quality control during product development of claim 16 wherein said engineering samples stage includes process qualification, package qualification, a product performance plan and characterization requirements.

23. The computer-based method for quality control during product development of claim 16 wherein said product stage includes a product performance plan and characterization requirements.

24. The computer-based method for quality control during product development of claim 16 wherein said product stage includes an engineering change notice requirement.

25. The computer-based method for quality control during product development of claim 16 wherein said engineering samples stage, said development product stage, and said product stage include a data sheet requirement.

26. The computer-based method for quality control development of claim 25 wherein said data sheet requirement generates a data sheet comprehending the data arising from the product produced at the time of the data sheet generation.

27. A computer-based quality control system for product development comprising:

product control matrix means, displayed on a display unit of a computer system, for monitoring product development wherein said product control matrix includes a plurality of product development stages and each product development stage includes a plurality of requirements wherein the plurality of requirements define the product development operations in the product development stage including engineering functions necessary for successful completion of subsequent product development stages and sequencing of engineering functions to ensure a selected time to market for said product;

each product development stage includes a gate having an open state and a closed state, wherein said gate is opened only when the requirements for the product development stage have been successfully completed and further wherein subsequent manufacturing control is based on the state of said gate; and first database means, operative in said computer system and operatively coupled to said product matrix means, for storing data generated for each requirement wherein upon completion of said product development, said first database means comprises a product development history;

second database means, operative in said computer system and operatively coupled to said product matrix means, for storing a description of requirements in said product development wherein in response to a user (i) selecting a requirement on said display unit and (ii) providing a predetermined input command from a data input means, the description for the selected requirement is displayed on said display unit.

28. The computer based quality control system for product development of claim 27 further comprising means, operatively coupled to said first database means, for generating a printed report upon completion of all the requirements in product development stages prior to introduction of the product to market wherein said printed report contains the results for all or selected requirements in product development stages prior to introduction of the product to market.

29. The computer-based quality control system for product development as in claim 27 wherein said product development stages include a design stage, an engineering samples stage, a development product stage, and a product stage.

30. The computer-based quality control system for product development as in claim 29 wherein said design stage includes a test plan requirement.

31. The computer-based quality control system for product development as in claim 29 wherein said design stage includes a packing design requirement.

32. The computer-based quality control system for product development as in claim 29 wherein said design stage includes process qualification, package qualification, a product performance plan and characterization requirements.

33. The computer-based quality control system for product development of claim 29 wherein said development product stage includes process qualification, package qualification, a product performance plan and characterization requirements.

34. The computer-based quality control system for product development as in claim 29 wherein said engineering samples stage includes a manufacturing logistics plan requirement for volume production.

35. The computer-based quality control system for product development of claim 29 wherein said engineering samples stage includes process qualification, package qualification, a product performance plan and characterization requirements.

36. The computer-based quality control system for product development of claim 29 wherein said product stage includes a product performance plan and characterization requirements.

37. The computer-based quality control system for product development of claim 29 wherein said product stage includes an engineering change notice requirement.

38. The computer-based quality control system for product development of claim 29 wherein said engineering samples stage, said development product stage, and said product stage include a data sheet requirement.

39. The computer-based quality control system for product development of claim 37 wherein said data sheet requirement generates a data sheet comprehending the data arising from the product produced at the time of the data sheet generation.

* * * * *